US012212668B2

(12) United States Patent
Sattler et al.

(10) Patent No.: US 12,212,668 B2
(45) Date of Patent: Jan. 28, 2025

(54) MOBILE EDGE NETWORK CRYPTOGRAPHIC KEY DELIVERY USING QUANTUM CRYPTOGRAPHY

(71) Applicant: Verizon Patent and Licensing Inc., Basking Ridge, NJ (US)

(72) Inventors: Lee E. Sattler, Mount Airy, MD (US); Matthew W. Turlington, Richardson, TX (US); Ashish Sardesai, Ashburn, VA (US); Kurt Allen McIntyre, The Colony, TX (US); Jean M. McManus, Bedford, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 389 days.

(21) Appl. No.: 17/706,809

(22) Filed: Mar. 29, 2022

(65) Prior Publication Data
US 2023/0318817 A1 Oct. 5, 2023

(51) Int. Cl.
*H04L 9/08* (2006.01)
(52) U.S. Cl.
CPC .......... *H04L 9/0852* (2013.01); *H04L 9/0819* (2013.01); *H04L 9/085* (2013.01)
(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 713/171, 150, 163, 181; 726/2, 21, 36; 380/255, 264, 276
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |
| 7,437,081 | B2 * | 10/2008 | Mitchell | H04B 10/70 398/154 |
| 8,675,876 | B2 * | 3/2014 | Yamamoto | H04L 9/0858 380/278 |
| 8,855,316 | B2 * | 10/2014 | Wiseman | H04L 9/0855 380/278 |
| 9,960,465 | B2 * | 5/2018 | Dudley | H01M 50/204 |
| 10,057,058 | B2 * | 8/2018 | Murakami | H04L 9/0858 |

(Continued)

*Primary Examiner* — Sharif E Ullah

(57) ABSTRACT

A first key management entity (KME) in a mobile edge network engages in quantum key distribution (QKD) with a second KME in a far network to generate a secret cryptographic key that is shared between the first KME and the second KME. The first KME determines a key identifier (ID) for associating with the cryptographic key, and sends the key ID to the second KME for association with the secret cryptographic key at the second KME. The first KME receives a session request from a first session endpoint for a session across at least one of the mobile edge network or the far network. The first KME sends the key ID and the cryptographic key to the first session endpoint for establishing an encrypted session across the at least one of the mobile edge network or the far network.

20 Claims, 16 Drawing Sheets

(56) References Cited

U.S. PATENT DOCUMENTS

| | | | |
|---|---|---|---|
| 10,541,809 B2* | 1/2020 | Godfrey | H04B 10/70 |
| 12,019,753 B2* | 6/2024 | Kreuzer | G06F 21/572 |
| 2005/0138352 A1* | 6/2005 | Gauvreau | H04L 9/3247 |
| | | | 713/153 |
| 2007/0065154 A1* | 3/2007 | Luo | H04J 14/0282 |
| | | | 398/141 |
| 2007/0076884 A1* | 4/2007 | Wellbrock | H04L 9/0855 |
| | | | 380/263 |
| 2007/0195774 A1* | 8/2007 | Sherman | H04L 69/16 |
| | | | 370/392 |
| 2011/0206204 A1* | 8/2011 | Sychev | H04J 14/0256 |
| | | | 380/256 |
| 2011/0213979 A1* | 9/2011 | Wiseman | H04L 9/0844 |
| | | | 713/171 |
| 2014/0010234 A1* | 1/2014 | Patel | H04L 45/74 |
| | | | 370/392 |
| 2014/0068765 A1* | 3/2014 | Choi | H04L 63/1416 |
| | | | 726/23 |
| 2014/0133652 A1* | 5/2014 | Oshida | H04L 9/0897 |
| | | | 380/255 |
| 2016/0241396 A1* | 8/2016 | Fu | H04L 9/0836 |
| 2016/0359626 A1* | 12/2016 | Fu | H04L 9/0858 |
| 2016/0366094 A1* | 12/2016 | Mason | H04L 61/5038 |
| 2017/0214525 A1* | 7/2017 | Zhao | H04W 12/0431 |
| 2017/0230173 A1* | 8/2017 | Choi | H04L 9/0861 |
| 2018/0176091 A1* | 6/2018 | Yoon | H04L 43/0888 |
| 2019/0036821 A1* | 1/2019 | Levy | G06F 12/0868 |
| 2019/0349392 A1* | 11/2019 | Wetterwald | H04L 43/0852 |
| 2020/0084222 A1* | 3/2020 | William | H04L 63/12 |
| 2020/0274701 A1* | 8/2020 | Yuan | H04L 9/0841 |
| 2024/0195834 A1* | 6/2024 | Septon | H04L 63/1475 |

* cited by examiner

MOBILE EDGE NETWORK CRYPTOGRAPHIC KEY DELIVERY USING QUANTUM CRYPTOGRAPHY

BACKGROUND

Within the field of cryptography, it is well recognized that the strength of any cryptographic system depends, among other things, on the key distribution technique employed. For conventional encryption to be effective, such as a symmetric key system, two communicating parties must share the same key and that key must be protected from access by others. The key must, therefore, be distributed to each of the parties. For a party, Bob, to decrypt ciphertext encrypted by a party, Alice, Alice or a third party must share a copy of the key with Bob. This distribution process can be implemented in a number of existing ways, which are vulnerable to interception of the distributed key by an eavesdropper Eve, or by Eve "cracking" a key agreement algorithm (e.g., Diffie-Helman key agreement). Eve can eavesdrop and intercept or copy a distributed key and then subsequently decrypt any intercepted ciphertext that is sent between Bob and Alice. In certain cryptographic systems, this eavesdropping may go undetected, with the result being that any ciphertext sent between Bob and Alice is compromised.

DETAILED DESCRIPTION OF EXAMPLE EMBODIMENTS

Figure 1:
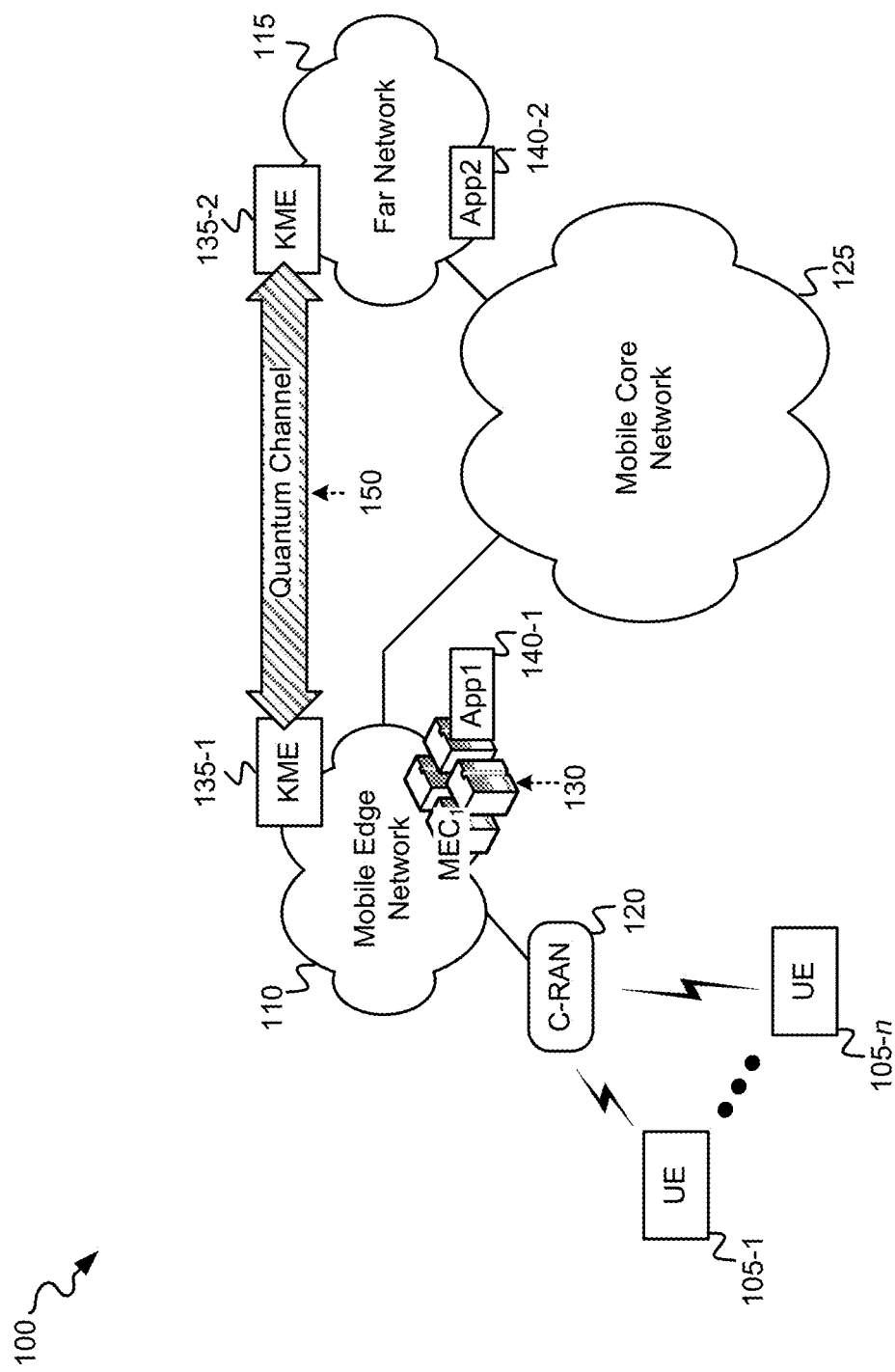
FIG. 1 illustrates an exemplary mobile network environment in which quantum cryptographic techniques are used for distributing encryption key material between a mobile edge network and a far network.

The following detailed description refers to the accompanying drawings. The same reference numbers in different drawings may identify the same or similar elements. The following detailed description does not limit the invention.

To combat inherent deficiencies in existing key distribution processes, quantum cryptographic key distribution techniques have been developed. Quantum cryptography employs quantum systems and fundamental principles of physics to ensure the security of distributed keys. Heisenberg's principle of observation mandates that any attempt to observe the state of a quantum system will necessarily induce a change in the state of that quantum system (i.e., the observer effect). Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, Eve, from copying or intercepting a key that has been distributed from Alice to Bob without a significant probability of Bob's or Alice's discovery of the eavesdropping.

One quantum key distribution (QKD) scheme involves a quantum channel, through which Alice and Bob send key material using polarized or phase encoded photons, and a public channel, through which Alice and Bob send ordinary messages. Since the polarized or phase encoded photons are employed for QKD, they are often termed QKD photons. The quantum channel is a transmission medium that isolates the QKD photons from interaction with the environment. The public channel may comprise a channel on any type of communication network such as a Public Switched Telephone network, the Internet, or a wireless network. An eavesdropper, Eve, may attempt to measure the photons on the quantum channel. Such eavesdropping, however, will induce a measurable disturbance in the photons (e.g., destroy the photons, in certain circumstances) in accordance with the Heisenberg's principle of observation. Alice and Bob use the public channel to discuss and compare the photons sent and received through the quantum channel. If, through their discussion and comparison, Alice and Bob determine that there is no evidence of eavesdropping, then the key material distributed via the quantum channel can be considered completely secret and subsequently used for, for example, encrypting communications over the public channel between Alice and Bob.

Quantum computing is an emerging technology that harnesses the laws of quantum mechanics to solve computational problems that are too complex for classical computers. Quantum algorithms implemented in quantum computers create multidimensional spaces where patterns linking individual data points emerge and enable the solving of complex computational problems. One of the consequences of the introduction of quantum computers is that such computers will more easily break the Rivest-Shamir-Adleman (RSA) and Elliptical Curve Cryptography (ECC)

encryption algorithms that are fundamental to the existing Public Key Infrastructure (PKI) systems that underpin most modern security, communication and identification applications. Encryption sessions between user equipment devices (UEs) and applications, such as within Fourth Generation (4G) or Fifth Generation (5G) wireless networks, utilize PKI processes that are not considered quantum computing safe. Therefore, new methods of establishing secure communication between UEs and applications will likely be required.

Example embodiments described herein use quantum cryptographic mechanisms and processes to implement QKD between mobile edge networks and far networks to enable the distribution of secure encryption key material for use by UEs and applications within the edge networks and the far networks. A "mobile edge network," as referred to herein, includes a network located on a periphery of a mobile core network and which brings computation (e.g., applications) and data storage close to UEs to deliver low latency service and to conserve mobile core network bandwidth. A "far network," as referred to herein, includes any network that is closer, from the standpoint of latency, to the mobile core network than a mobile edge network and, thus, is farther away from the UEs relative to the mobile edge network. The encryption keys resulting from the QKD may subsequently be used for encrypting sessions between the UEs and applications in either the mobile edge networks or the far networks, or between different applications across the edge networks and the far networks. In example embodiments described herein, key management entities residing within the mobile edge networks and far networks generate, for example, symmetric encryption keys based on the key material distributed using QKD, and determine a key identifier for sharing between the key management entities. The key management entities may subsequently send the key identifier, and associated encryption key, to each endpoint of a session for encrypting data transported between the endpoints during the session. Thus, encryption of sessions between mobile edge networks and far networks using PKI processes may be replaced, using the processed described herein, with the encryption of sessions using quantum cryptographic (QC)-generated encryption keys.

FIG. 1 illustrates an exemplary mobile network environment 100 in which quantum cryptographic techniques are used for distributing encryption key material between mobile edge networks and far networks without using Public Key Infrastructure (PKI). Mobile network environment 100 may include multiple user equipment devices (UEs) 105-1 through 105-n, a mobile edge network 110, a far network 115, a cloud Radio Access Network (C-RANs) 120, and a mobile core network 125.

UEs 105-1 through 105-n (generically referred to as "UEs 105" or "UE 105") may each include an electronic device that further includes at least one wireless communication interface for communicating via a RAN of a mobile network, such as a C-RAN 120 of mobile network environment 100. UEs 105 may each include, for example, a cellular radiotelephone (e.g., a smart phone); a personal digital assistant (PDA); a wearable computer; a desktop, laptop, palmtop or tablet computer; or a media player. UEs 105 may, however, include any type of electronic device that includes a wireless communication interface for communicating via a wireless network. A "user" or "subscriber" (not shown in FIG. 1) may be associated with each UE 105, where the user or subscriber may be an owner, operator, and/or a permanent or temporary user of UE 105.

Mobile edge network 110 includes one or more edge computing data centers (e.g., Multi-Access Edge Computing (MEC) platforms), or other edge devices, that enable the movement of traffic and network services from mobile core network 125 towards the edge of mobile network environment 1000 and closer to the destination devices (e.g., UEs 105). Instead of sending data to mobile core network 125 for processing, routing, and transport, mobile edge network 110 includes components that handle the data closer to the destination devices, thereby reducing latency. Mobile edge network 110 may include, for example, at least one MEC platform 130 (generically referred to herein as "MEC 130" or "MECs 130") and a first key management entity (KME) 135-1.

MEC 130 may be located in proximity to a particular location (e.g., city center, stadium, theme park, etc.), or a particular geographic area or region, to enable UEs 105 to access low-latency network services at the particular location, area, or region. The low-latency services may include, for example, MEC 130 hosting specific applications, such as application (App1) 140-1, for access and use by UEs 105 that are in proximity to the particular location, area or region. KME 135-1 may include a network device that, among other components, includes a quantum cryptographic transceiver that performs quantum key distribution (QKD) with other KMEs (e.g., with KME 135-2), via a quantum channel 150, such that secret key material (e.g., symmetric encryption keys) may be distributed between KMEs with a high degree of confidence that an eavesdropper has not intercepted the key material. Quantum channel 150 includes, for example, a transmission medium that isolates QKD photons from interaction with the external environment. Quantum channel 150 may, in this example, involve the transmission of QKD photons across an optical link (e.g., optic fiber link) or optical network that is separate from mobile edge network 110, far network 115, and/or mobile core network 125. Though not shown in FIG. 1, mobile edge network 110 may connect to a Packet Data Network (PDN) (not shown) in addition to connecting to mobile core network 125 and to far network 115. In one implementation, far network 115 may include a PDN.

Far network 115 includes any type of network that is closer to mobile core network 125 than mobile edge network 110 and farther away from the UEs 105 than mobile edge network 110. Far network 115 may, for example, include a local area network(s) (LAN), a wide area network(s) (WAN), a metropolitan area network (MAN), an Internet Protocol Multimedia Subsystem (IMS) network, and/or the Internet. Far network 115 may include one or more other types of networks, not described above, that have a greater latency when transporting data to/from UEs 105 relative to mobile edge network 110. Far network 115 may include one or more network devices (not shown) and a second KME 135-2.

The one or more network devices residing in far network 115 may host specific applications, such as application (App2) 140-2, for access and use by UEs 105. KME 135-2 may include a network device that, among other components, includes a quantum cryptographic transceiver that performs QKD with other KMEs (e.g., KME 135-1) such that secret key material (e.g., symmetric encryption keys) may be distributed between KMEs with a high degree of confidence that an eavesdropper has not intercepted the key material. Though not shown in FIG. 1, far network 115 may connect to a PDN (not shown) and to mobile edge network 110 in addition to connecting to mobile core network 125.

C-RAN 120 (generically referred to herein as "C-RAN 120") may include various types of radio access equipment that perform Radio Frequency (RF) communication with UEs 105. The radio access equipment of C-RAN 120 may include, for example, multiple distributed Remote Radio Units (RRUs) and at least one C-RAN baseband unit (BBU) hub. Each of the RRUs includes a device(s) that operates as a radio function unit and may include at least one antenna array, transceiver circuitry, and other hardware and software components for enabling the RRUs to receive data via wireless RF signals from UEs 105, and to transmit wireless RF signals to UEs 105. Each C-RAN BBU hub includes multiple BBUs that are co-located together, usually in a same physical installation, and which interconnect with the distributed RRUs of CRAN 120 via fronthaul links or a fronthaul network. Each C-RAN 120 may include additional nodes, functions, and/or components not described herein.

Mobile core network 125 includes core components of a wireless network that provide wireless access and mobile wireless service to subscribing UEs 105. The wireless network may include any type of wireless network that provides wireless access and connectivity to UEs 105. The wireless network may include, for example, a Public Land Mobile Network (PLMN) or a satellite network. Mobile core network 125 may include, for example, a Next Generation Mobile network (e.g., a Fifth Generation (5G) mobile network), a Fourth Generation (4G) mobile network, a 4.5G Long Term Evolution (LTE) mobile network, or a hybrid 4G/5G mobile network. Mobile core network 125 may include various different network functions (NFs) that cooperate with one another to provide wireless network services to UEs 105. Each of the NFs may be implemented by one or more network devices (not shown) within mobile core network 125. In the case of a 5G wireless network, the mobile core NFs may include, among other NFs, an Access and Mobility Management Function (AMF), a Policy Control Function (PCF), a Session Management Function (SMF), and User Plane (UP) functions. In the case of a Fourth Generation (4G) wireless network, or other types of wireless networks, mobile core network 125 may include different core NFs that possibly perform different functions than the components of a 5G wireless network.

The configuration of the components of network environment 100 depicted in FIG. 1 is for illustrative purposes only, and other configurations may be implemented. Therefore, mobile network environment 100 may include additional, fewer and/or different components, that may be configured differently than depicted in FIG. 1. For example, though a single MEC 130 is shown in mobile edge network 110, mobile edge network 110 may include multiple MECs 130. As another example, though only a single far network 115 is shown in FIG. 1, network environment 100 may include multiple far networks 115, with each having its own KME 135 and one or more network devices executing at least one application 140.

Figure 2:
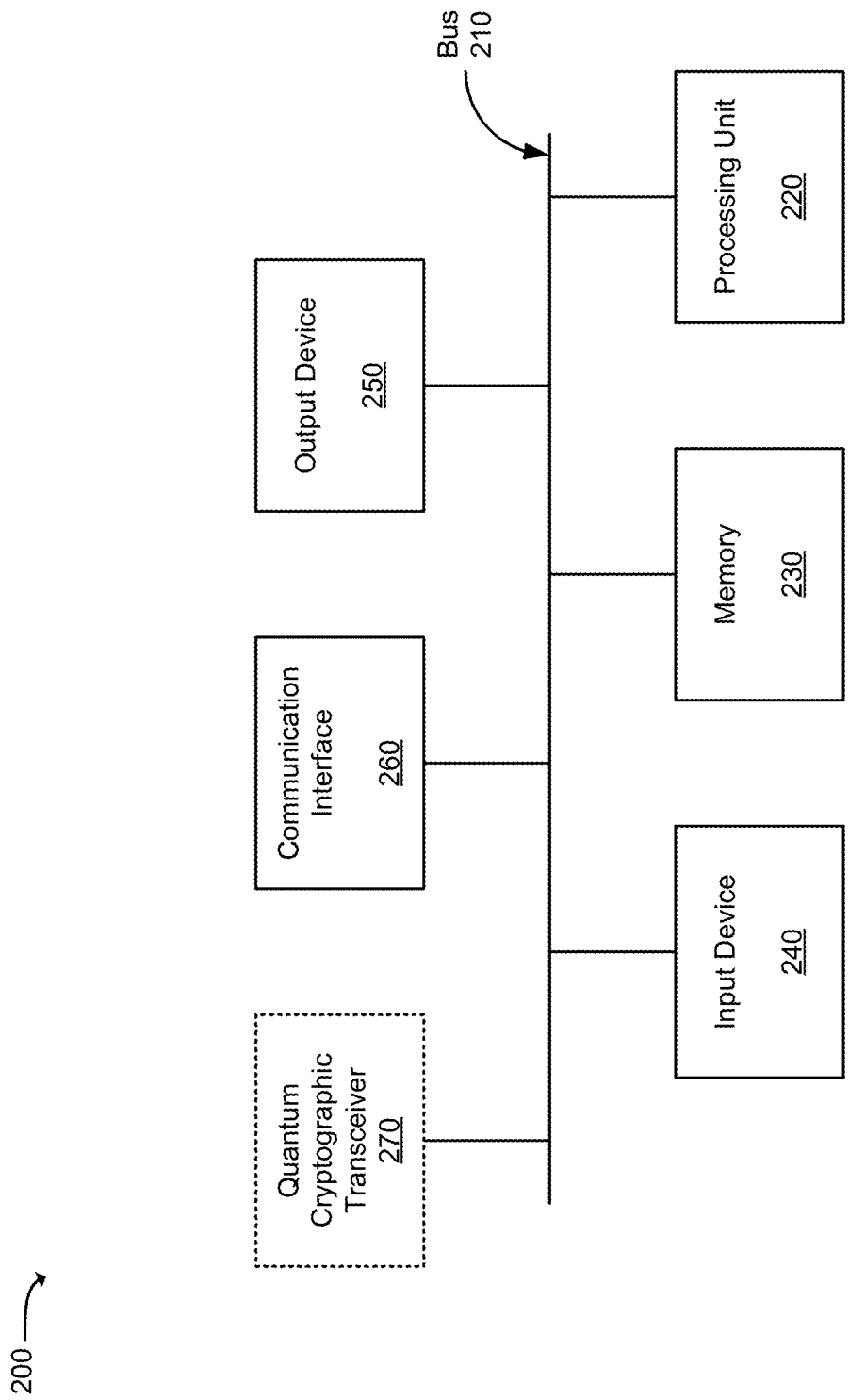
FIG. 2 is a diagram that depicts exemplary components of a network device used herein.

FIG. 2 is a diagram that depicts exemplary components of a network device 200 (referred to herein as a "network device" or a "device"). UEs 105, data centers of MEC 130, KMEs 135, network devices in mobile core network 125 and far network 115, and devices of C-RANs 120 may include one or more components that are the same as, or similar to, those of device 200 shown in FIG. 2. NFs of mobile core network 125 and app2 140-2 of far network 115 may each be implemented by a device that includes components that are the same as, or are similar to, those of network device 200. Some of the NFs may be implemented by a same device 200 within mobile core network 125, while others of the functions may be implemented by one or more separate devices 200.

Device 200 may include a bus 210, a processing unit 220, a memory 230, an input device 240, an output device 250, and a communication interface 260. In the case of KMEs 135, device 200 may additionally include a quantum cryptographic transceiver 270. Bus 210 may include a path that permits communication among the components of device 200. Processing unit 220 may include one or more processors or microprocessors which may interpret and execute instructions, or processing logic. Memory 230 may include one or more memory devices for storing data and instructions. Memory 230 may include a random-access memory (RAM) or another type of dynamic storage device that may store information and instructions for execution by processing unit 220, a Read Only Memory (ROM) device or another type of static storage device that may store static information and instructions for use by processing unit 220, and/or a magnetic, optical, or flash memory recording and storage medium. The memory devices of memory 230 may each be referred to herein as a "tangible non-transitory computer-readable medium," "non-transitory computer-readable medium," or "non-transitory storage medium." In some implementations, the processes/methods set forth herein can be implemented as instructions that are stored in memory 230 for execution by processing unit 220.

Input device 240 may include one or more mechanisms that permit an operator to input information into device 200, such as, for example, a keypad or a keyboard, a display with a touch sensitive panel, voice recognition and/or biometric mechanisms, etc. Output device 250 may include one or more mechanisms that output information to the operator, including a display, a speaker, etc. Input device 240 and output device 250 may, in some implementations, be implemented as a user interface (UI) that displays UI information and which receives user input via the UI.

Communication interface 260 may include a transceiver(s) that enables device 200 to communicate with other devices and/or systems. For example, communication interface 260 may include one or more wired and/or wireless transceivers for communicating via C-RAN 120, mobile edge network 110, far network 115, or mobile core network 125. In the case of UEs 105 and wireless communication with C-RAN 120, communication interface 260 may include one or more antennas for transmitting radio frequency (RF) signals to the C-RAN 120. In the case RRUs of C-RAN 120, communication interface 260 may further include one or more antenna arrays for producing radio frequency (RF) cell sectors for use by UEs 105. Quantum cryptographic transceiver 270 may include mechanisms for transmitting and/or receiving QKD photons using quantum cryptographic techniques, as described further below with respect to FIGS. 5-7. Quantum cryptographic transceiver 270 may be included in device 200 in implementations in which device 200 is, for example, a KME 135.

The configuration of components of network device 200 illustrated in FIG. 2 is for illustrative purposes. Other configurations may be implemented. Therefore, network device 200 may include additional, fewer and/or different components, that may be arranged in a different configuration, than depicted in FIG. 2.

Figure 3:
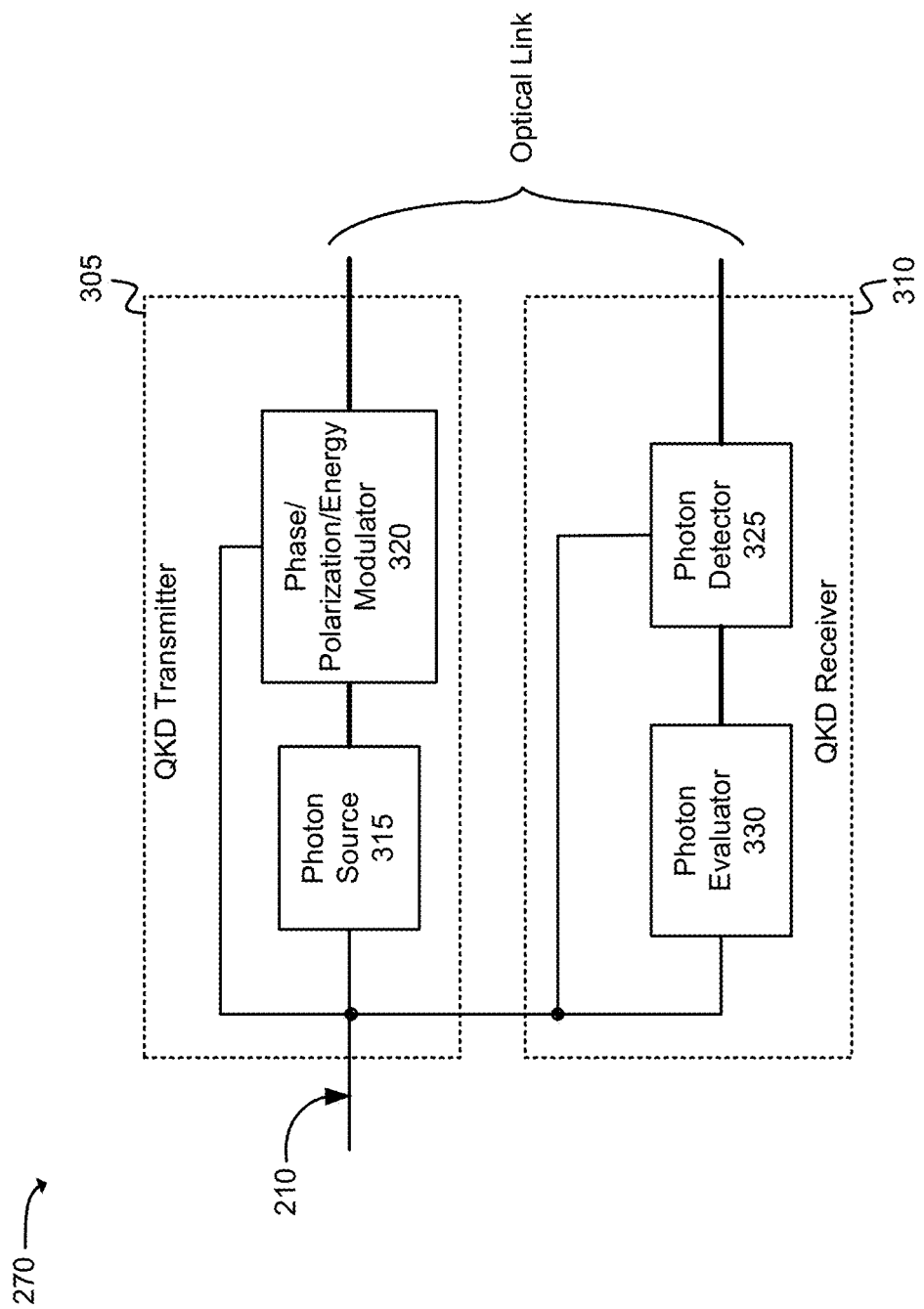
FIG. 3 illustrates exemplary components of a quantum cryptographic transceiver of a key management entity.

FIG. 3 illustrates components of quantum cryptographic transceiver 270 of a KME 135 according to an example embodiment. Quantum cryptographic transceiver 270 may include a QKD transmitter 305 and a QKD receiver 310. QKD transmitter 305 may include a photon source 315 and a phase/polarization/energy modulator 320. Photon source 315 can include, for example, a conventional laser. Photon source 315 may produce photons according to instructions provided by processing unit 220 (not shown in FIG. 3). Photon source 315 may produce photons of light with wavelengths throughout the electromagnetic spectrum, including light in the human visible spectrum and light beyond the human-visible spectrum, such as, for example, infrared or ultraviolet light. Phase/polarization/energy modulator 320 may encode outgoing photons from the photon source according to commands received from processing unit 220 for transmission across an optical link. Phase/polarization/energy modulator 320 may include, for example, a Mach-Zehnder interferometer(s).

QKD receiver 310 may include a photon detector 325 and a photon evaluator 330. Photon detector 325 detects QKD photons received across the optical link. Photon detector 325 may include, for example, an avalanche photo detector(s) (APD(s)) or a photo-multiplier tube(s) (PMT(s)). Photon detector 325 may alternatively include cryogenically cooled detectors that sense energy via changes in detector temperature or electrical resistivity as photons strike the detector apparatus. Photon evaluator 330 may include circuitry for processing and evaluating output signals from photon detector 325 in accordance with quantum cryptographic techniques.

Figure 4:
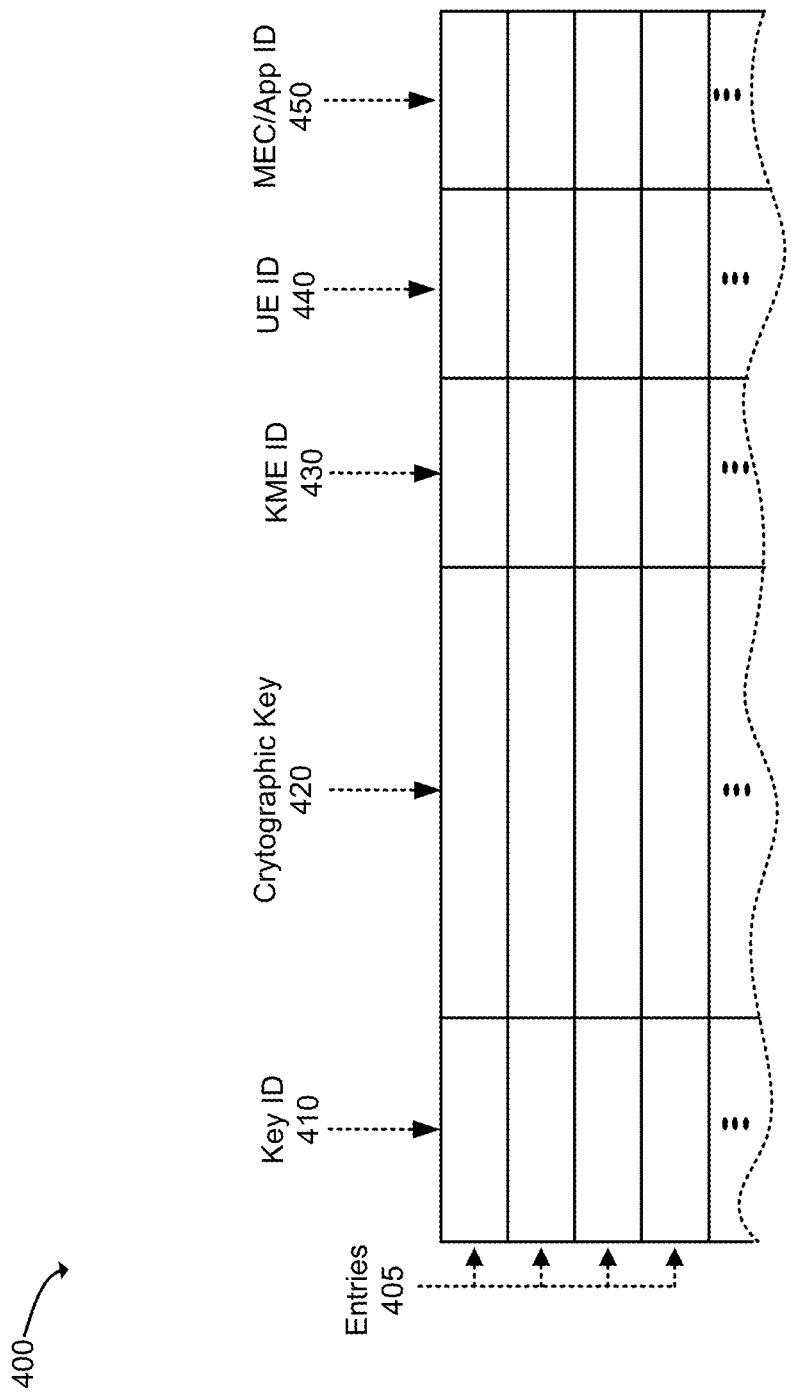
FIG. 4 depicts an example of a data structure that may be stored in a memory associated with a key management entity.

FIG. 4 depicts an example of a data structure 400 that may be stored in a memory associated with, for example, each KME 135 within mobile network environment 100. For example, the data structure 400 of FIG. 4 may be stored in memory 230 of a KME 135. The data structure 400 may alternatively be stored in a memory in association with one or more other devices of mobile network environment 100 (e.g., a network device storing an external database). As shown, the data structure 400 may include multiple entries 405, with each entry 405 including, for example, a key identifier (ID) field 410, a cryptographic key field 420, a KME ID field 430, a UE ID field 440, and a MEC/app ID field 450. Data may be stored, or updated, in the fields of entries 405 of data structure 400 during execution of the processes of FIGS. 5, 8, 10, and/or 12 below.

Key ID field 410 stores a unique ID associated with the encryption key stored in the corresponding cryptographic key field 420 of the entry 405. Cryptographic key field 420 stores an encryption key generated using QKD between two KMEs 135 (e.g., KME 135-1 in mobile edge network 110 and KME 135-2 in far network 115), as described below with respect to FIGS. 5-7. In one implementation, the encryption key may include a symmetric encryption key.

KME ID field 430 stores a unique ID associated with another KME 135 with which QKD has been performed to distribute key material and generate the encryption key identified in field 410 and stored in field 420. UE ID field 440 stores a unique ID associated with a UE 105 to which the encryption key, identified in the corresponding field 410 of entry 405, has been issued for an encrypted session. MEC/app ID field 440 stores at least one unique ID associated with a MEC 130, and/or an app 140, to which the encryption key, identified in the corresponding field 410 of entry 405, has also been issued for the encrypted session.

To locate a particular entry 405, data structure 400 may be queried with particular data to locate an entry 405 having matching data stored in one of the fields 410, 420, 430, 440, and/or 450. When such an entry 405 is located, data may be stored in one or more fields of the entry 405, or data may be retrieved from one or more fields of the entry 405. For example, if a key ID for a particular encryption key is known, then the entries 405 of data structure 400 may be queried to locate an entry 405 having a matching key ID stored in field 410. In this example, upon locating the entry 405 with a matching field to the known key ID, then the data stored in cryptographic key field 420, the KME ID field 430, and/or the MEC/app ID field 450 may be retrieved.

Data structure 400 of FIG. 4 is depicted as including a tabular data structure with a certain number of fields having certain content. The tabular data structure shown in FIG. 4, however, is for illustrative purposes. Other types of data structures may alternatively be used. The number, types, and content of the entries and/or fields in the data structures illustrated in FIG. 4 are also for illustrative purposes. Other data structures having different numbers, types, and/or content of the entries and/or the fields may be implemented. Therefore, the data structure 400 depicted in FIG. 4 may include additional, fewer and/or different entries and/or fields than those shown.

Figure 5:
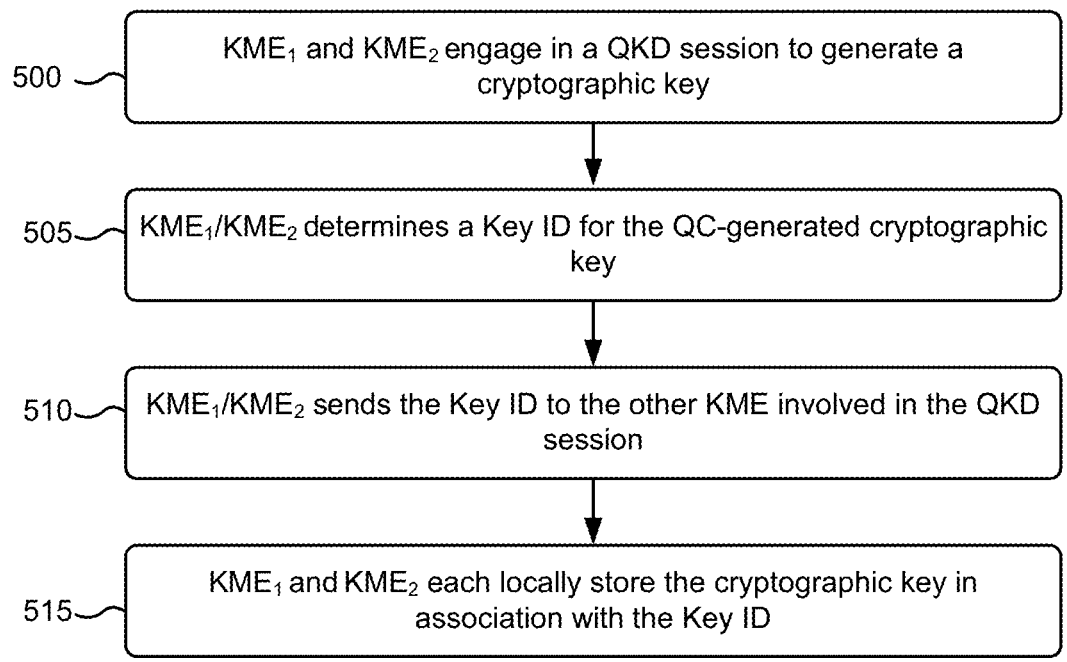
FIG. 5 is a flow diagram of an example process for engaging in Quantum Key Distribution, using quantum cryptography, to distribute a secret cryptographic key between two key management entities.

FIG. 5 is a flow diagram of an example process for engaging in QKD, using quantum cryptography, to distribute a secret cryptographic key between two KMEs 135. The example process of FIG. 5 may be implemented by two KMEs 135 in mobile network environment 100 (e.g., KME 135-1 in mobile edge network 110 and KME 135-2 in far network 115) engaging in QKD to distribute key material and to generate a secret encryption key. The example process of FIG. 5 is described below with reference to FIGS. 6 and 7. The example process of FIG. 5 may be repeated, for example, for each secret cryptographic key distributed between two KMEs 135 using QKD.

Figure 6:
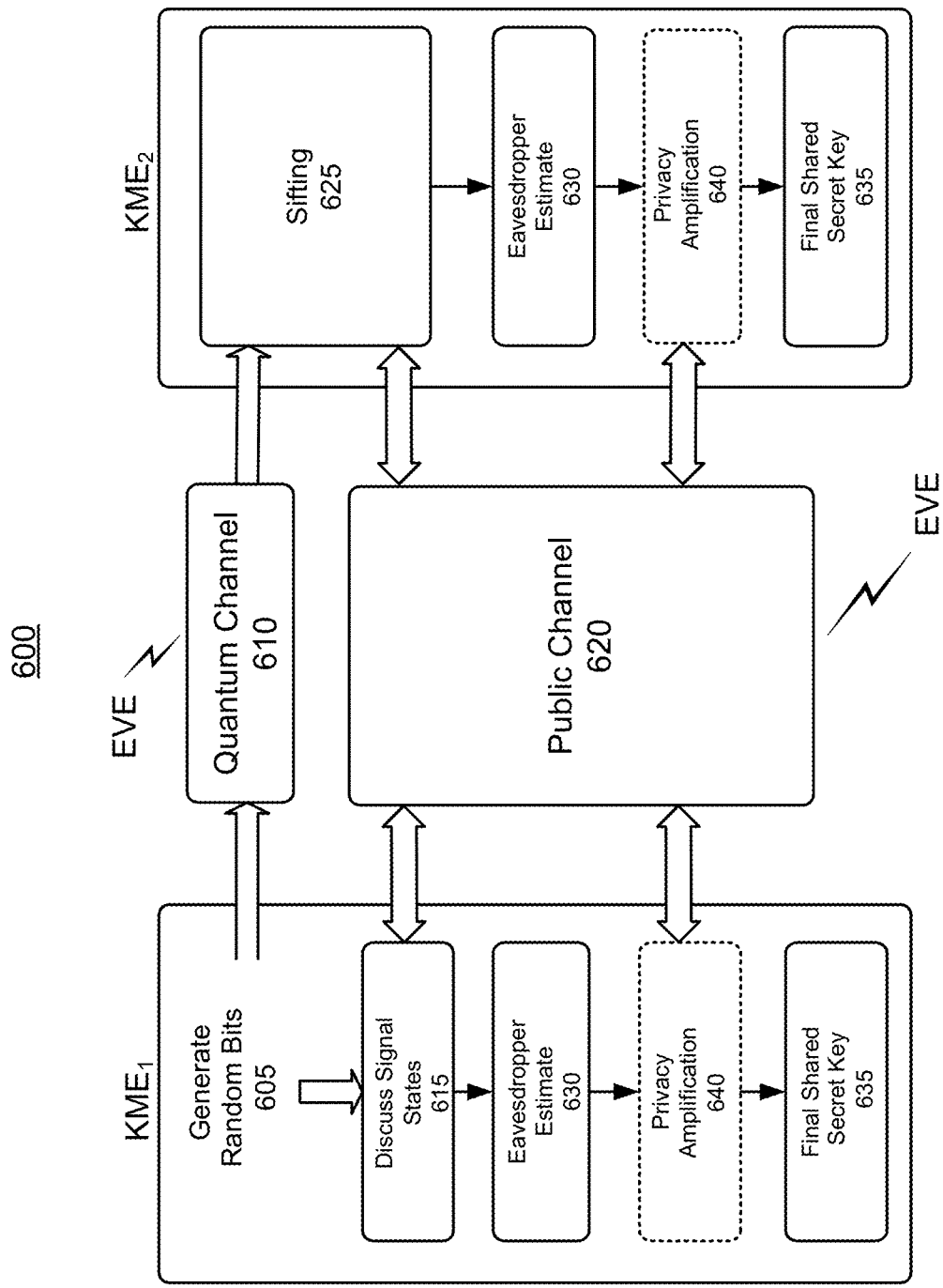
FIGS. 6 and 7 illustrate an example scheme for Quantum Key Distribution in which the polarization of each photon is used for encoding cryptographic values.
Figure 7:
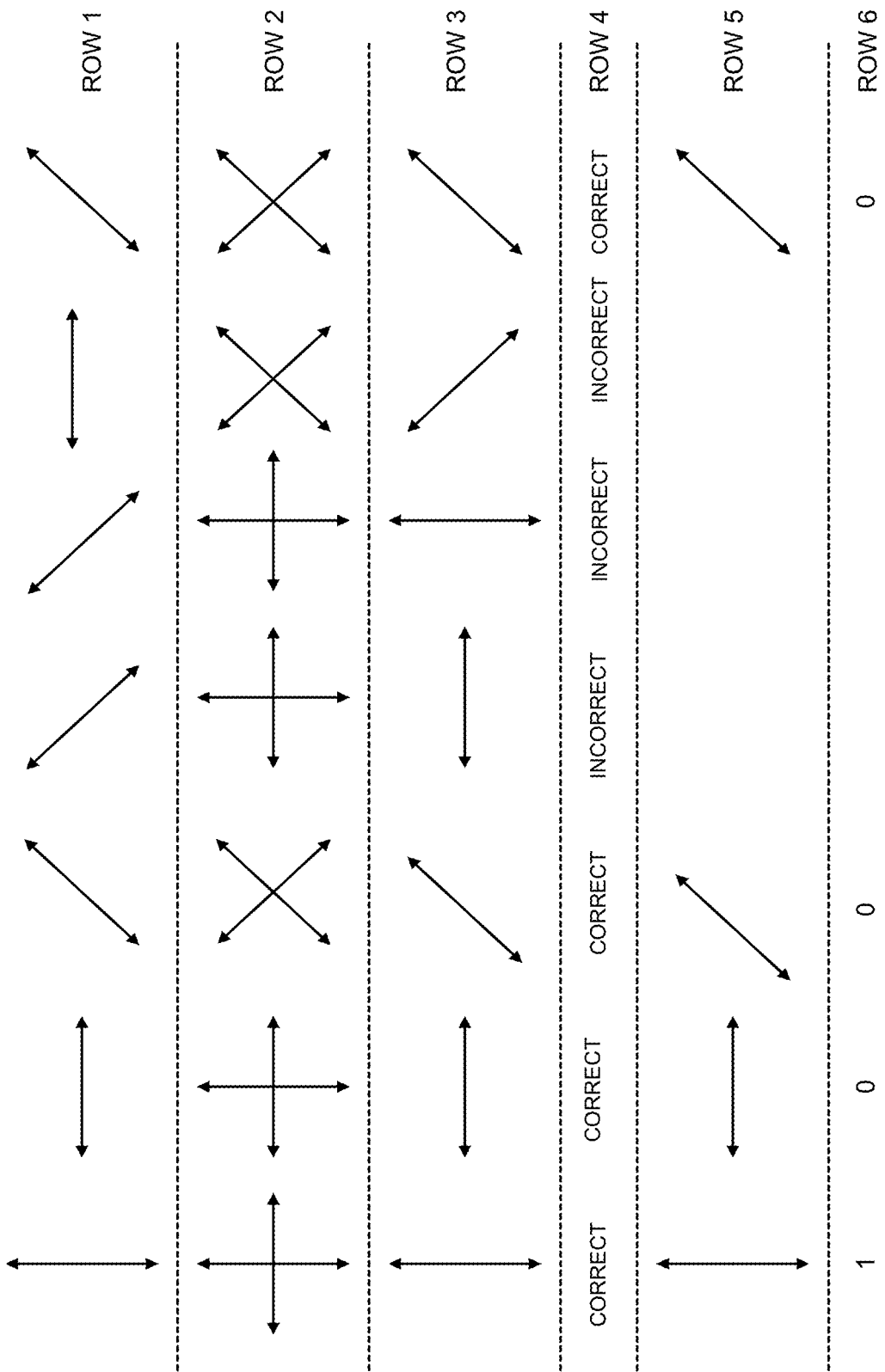

The example process may include a first KME 135 (KMEs) and a second KME (KME$_2$) engaging in a QKD session, using quantum cryptography, to distribute key material between the KMEs and to generate a cryptographic key (block 500). Referring to FIG. 1, the first KME (KME$_1$) may be KME 135-1 in mobile edge network 110 and the second KME (KME$_2$) may be KME 135-2 in far network 115. FIGS. 6 and 7 illustrate an example scheme 600 for QKD in which the polarization of each photon is used for encoding cryptographic values. "Engaging in a QKD session," as referred to herein may involve KME$_1$ and KME$_2$ implementing the example scheme 600 described below and shown in FIGS. 6 and 7. "Engaging in a QKD session," however, may alternatively involve other schemes for QKD using quantum particles, such as modulating other photon parameters (e.g., phase, energy), not described herein. To begin the QKD session, KME$_1$ generates random bit values 605 (FIG. 6) and then encodes the bits as polarization states (e.g., 0°, 45°, 90°, 135°) in a sequence of photons sent via the quantum channel 150 (see row 1 of FIG. 7). KME$_1$ keeps the polarization states of the photons that have been transmitted in secret (i.e., KME$_1$ does not share this information with any other entity, including KME$_2$). KME$_2$ receives the photons and measures their polarization along either a rectilinear or diagonal basis with randomly selected and substantially equal probability. KME$_2$ records the chosen rectilinear or diagonal basis (see row 2 of FIG. 7) and the measurement results (see row 3 of FIG. 7) for each measured photon. KME$_2$ and KME$_1$ discuss 615 (FIG. 6), via a public channel 620, which basis, either rectilinear or diagonal, that KME$_2$ has chosen to measure each photon. Public channel 620 may include data transport between KME$_1$ (e.g., KME 135-1) and KME$_2$ (e.g., KME 135-2) across mobile edge network 110, mobile core network 125, and/or far network 115. KME$_2$, however, does not inform KME$_1$ of the result of KME$_2$'s measurements. KME$_1$ informs KME$_2$, via the public channel 620, whether KME$_2$ has made the measurement along the correct basis (see row 4 of FIG. 7). In a process called "sifting" 625 (FIG. 6), both KME$_1$ and KME$_2$ then discard all cases in which KME$_2$ has made the measurement along the wrong basis and keep only the ones in which $KME_2$ has made the measurement along the correct basis (see row 5 of FIG. 7).

$KME_1$ and $KME_2$ then estimate 630 (FIG. 6) whether an eavesdropper ("Eve") has eavesdropped upon the key distribution. To do this, $KME_1$ and $KME_2$ must agree upon a maximum tolerable error rate. Errors can occur due to intrinsic noise of the quantum channel and due to an eavesdropping attack by a third party. $KME_1$ and $KME_2$ choose randomly a subset of photons m from the sequence of photons that have been transmitted and measured on the same basis. For each of them photons, $KME_2$ announces publicly $KME_2$'s measurement result. $KME_1$ informs $KME_2$ whether $KME_2$'s result is the same as what $KME_1$ had originally sent. Then both $KME_1$ and $KME_2$ compute the error rate of the m photons and, since the measurement results of the m photons have been discussed publicly, the polarization data of the m photons are discarded. If the computed error rate is higher than the agreed upon tolerable error rate (e.g., error rate>15%), $KME_1$ and $KME_2$ infer that substantial eavesdropping has occurred. They then discard the current polarization data and start over with a new sequence of photons. If the error rate is acceptably small, $KME_1$ and $KME_2$ adopt the remaining polarizations, or some algebraic combination of their values, as secret bits of a shared secret cryptographic key 635 (FIG. 6), interpreting horizontal or 45 degree polarized photons as binary 0's and vertical or 135 degree photons as binary 1's (see row 6 of FIG. 7).

$KME_1$ and $KME_2$ may also implement an additional privacy amplification process 640 (FIG. 6) that reduces the key to a small set of derived bits to reduce Eve's knowledge of the key. If, subsequent to discussion 615 and sifting 625, $KME_1$ and $KME_2$ adopt n bits as secret bits, the n bits can be compressed using, for example, a hash function. $KME_1$ and $KME_2$ agree upon a publicly chosen hash function $f$ and take $K=f(n \text{ bits})$ as the shared r-bit length key K. The hash function randomly redistributes the n bits such that a small change in bits produces a large change in the hash value. Thus, even if Eve determines a number of bits of the transmitted key through eavesdropping, and also knows the hash function $f$, she still will be left with very little knowledge regarding the content of the hashed r-bit key K. The adopted n secret bits, or the n bits compressed by the hash function to r bits, may be designated by $KME_1$ and $KME_2$ as the generated cryptographic key of block 500. $KME_1$ and $KME_2$ may additionally authenticate the public channel transmissions to prevent a "man-in-the-middle" attack in which Eve masquerades as either $KME_2$ or $KME_1$.

Subsequent to generation of the cryptographic key, $KME_1$ or $KME_2$ determine a key ID for the QC-generated cryptographic key of block 500 (block 505). The key ID may include any type of ID that uniquely identifies the key generated in block 500. In some implementations, a function (e.g., a hash function) may be applied to a portion of the bits, or all of the bits, of the QC-generated cryptographic key K of block 500 to generate the unique key ID.

$KME_1$ or $KME_2$ sends the determined key ID for the QC-generated cryptographic key to the other KME involved in the QKD session (block 510). In an example in which KME 135-1 and KME 135-2 engage in the QKD session of block 500, and KME 135-1 determines the key ID of block 505, then KME 135-1 may send, via the public channel, the key ID to KME 135-2. $KME_1$ and $KME_2$ each locally store the secret cryptographic key in association with the key ID (block 515). For example, KMEs 135-1 and 135-2 may each locally store their own separate data structures 400 of FIG. 4. KME 135-1 stores the QC-generated cryptographic key in field 420, and the key ID in field 410, of an entry 405 of its own locally stored data structure 400. KME 135-1 may additionally store a unique ID associated with KME 135-2 in field 430 of the entry 405 in its locally stored data structure 400. KME 135-2 also stores the QC-generated cryptographic key in field 420, and the key ID in field 410, of an entry 405 of its own locally stored data structure 400. KME 135-2 may additionally store a unique ID associated with KME 135-1 in field 430 of the entry 405 in its locally stored data structure 400.

Figure 8:
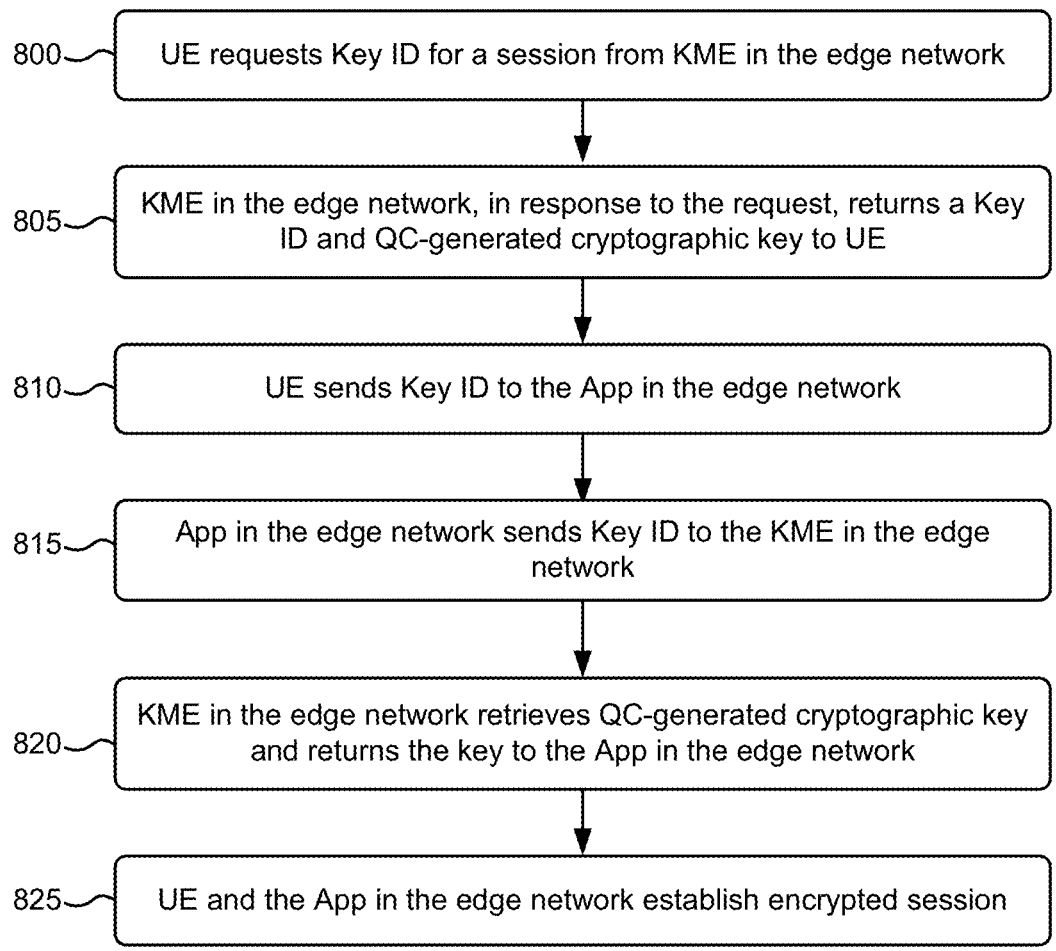
FIG. 8 is a flow diagram of an example process for establishing an encrypted session between a user equipment device and an application of a Multi-Access Edge Computing platform (MEC) in a mobile edge network using a quantum cryptographic-generated cryptographic key.

FIG. 8 is a flow diagram of an example process for establishing an encrypted session between a UE 105 and an app 140 of a MEC 130 in mobile edge network 110 using a QC-generated cryptographic key from the process of FIG. 5. The example process of FIG. 8 may be implemented by a KME 135-1 in mobile edge network 110 in conjunction with a UE 105, and an app 140-1 of a MEC 130 in mobile edge network 110. The example process of FIG. 8 is described below with reference to FIG. 9. The example process of FIG. 8 may occur subsequent to two KMEs 135 (e.g., KME 135-1 in mobile edge network 110 and KME 135-2 in far network 115) engaging in QKD (identified with a "1" within a circle in FIG. 9) to distribute key material and to generate a symmetric encryption key, as described above with respect to FIGS. 5-7. The example process of FIG. 8 may be repeated, for example, for each encrypted session that is to be established between a UE 105 and an app 140-1 of a MEC 130 in mobile edge network 110.

Figure 9:
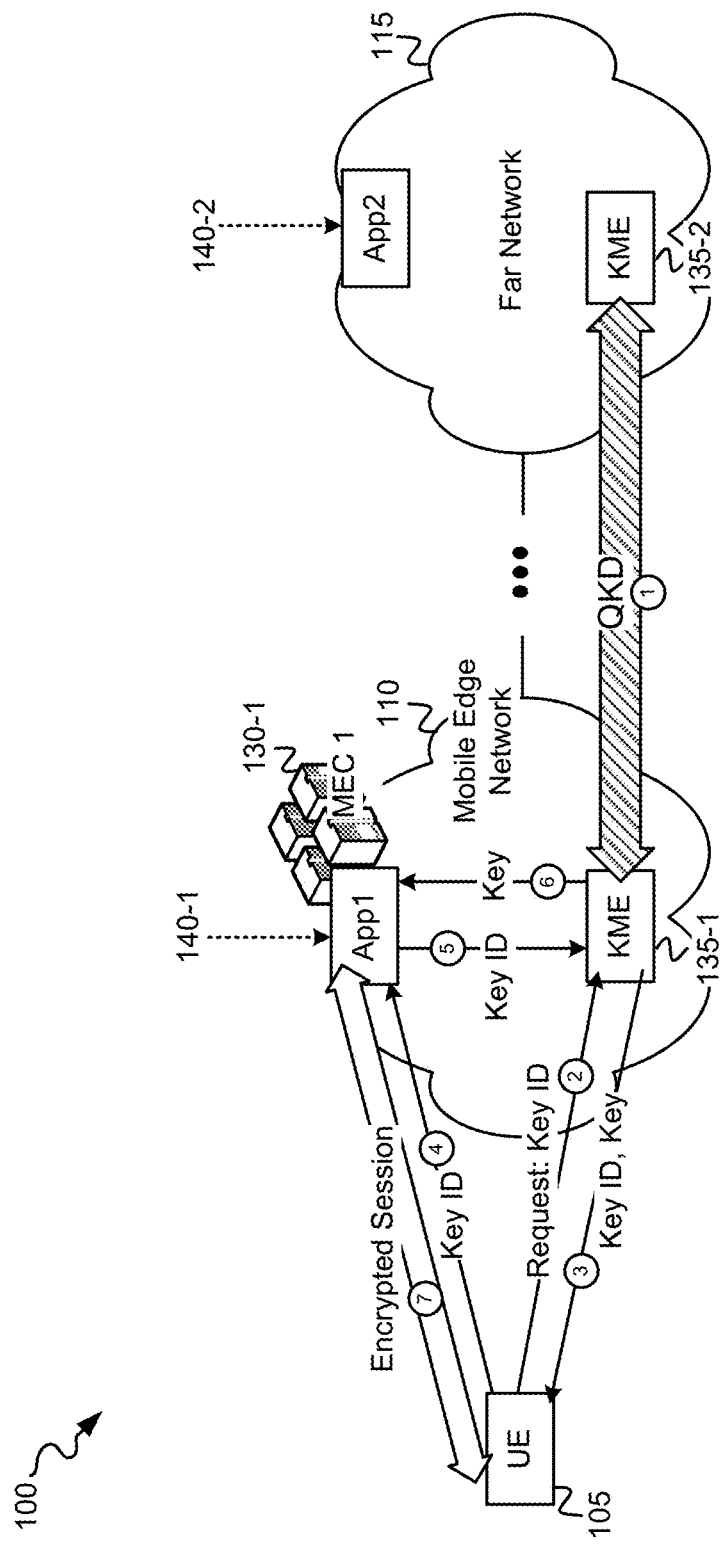
FIG. 9 depicts exemplary operations, messages, and/or data flows associated with an example process.

The example process may include a UE 105 requesting a key ID for a session from KME 135-1 in mobile edge network 110 (block 800). KME 135-1 in mobile edge network 110, in response to the UE request, returns a key ID and a QC-generated cryptographic key to the requesting UE 105 (block 805). FIG. 9 depicts UE 105 sending a Request (identified with a "2" within a circle) for a key ID, and KME 135-1 returning a message (identified with a "3" within a circle) that includes the requested key ID, and the symmetric encryption key that is associated with the key ID.

The UE 105 sends the received key ID to an app 140-1 in mobile edge network 110 with which it is requesting a session (block 810), and the app 140-1 in mobile edge network 110, in turn, sends the received key ID to KME 135-1 in mobile edge network 110 (block 815). FIG. 9 shows UE 105 sending a key ID (identified with a "4" within a circle) to app 140-1, and app 140-1 further sending the received key ID (identified with a "5" within a circle) to KME 135-1.

KME 135-1 in mobile edge network 110 retrieves a QC-generated cryptographic key, that corresponds to the received key ID, and returns the key to the app 140-1 in mobile edge network 110 (block 820). KME 135-1 may perform a query to locate an entry 405 in data structure 400 having a key ID in field 410 that matches the received key ID. Upon locating the entry 405 with the matching key ID in field 410, KME 135-1 retrieves the cryptographic key stored in field 420 of the located entry 405. FIG. 9 depicts KME 135-1 sending the retrieved cryptographic (identified with a "6" within a circle) to app 140-1 executing at MEC 130.

UE 105 and app 140-1 in mobile edge network 110 establish an encrypted session using the QC-generated cryptographic key (block 825). UE 105 and app 140-1 may each use existing symmetric encryption/decryption techniques, and the cryptographic key, to encrypt and decrypt data sent between UE 105 and app 140-1. For example, UE 105 encrypts data, using the symmetric cryptographic key, and sends the encrypted data to app 140-1 as part of the encrypted session. App 140-1, upon receipt of the encrypted data, decrypts the data using the symmetric cryptographic key. Similarly, UE 105 may decrypt data, using the symmetric cryptographic key, sent from app 140-1 and encrypted by app 140-1 also using the symmetric cryptographic key. FIG. 9 shows UE 105 and app 140-1 engaging in an encrypted session (identified with a "7" within a circle) across mobile edge network 110.

Figure 10:
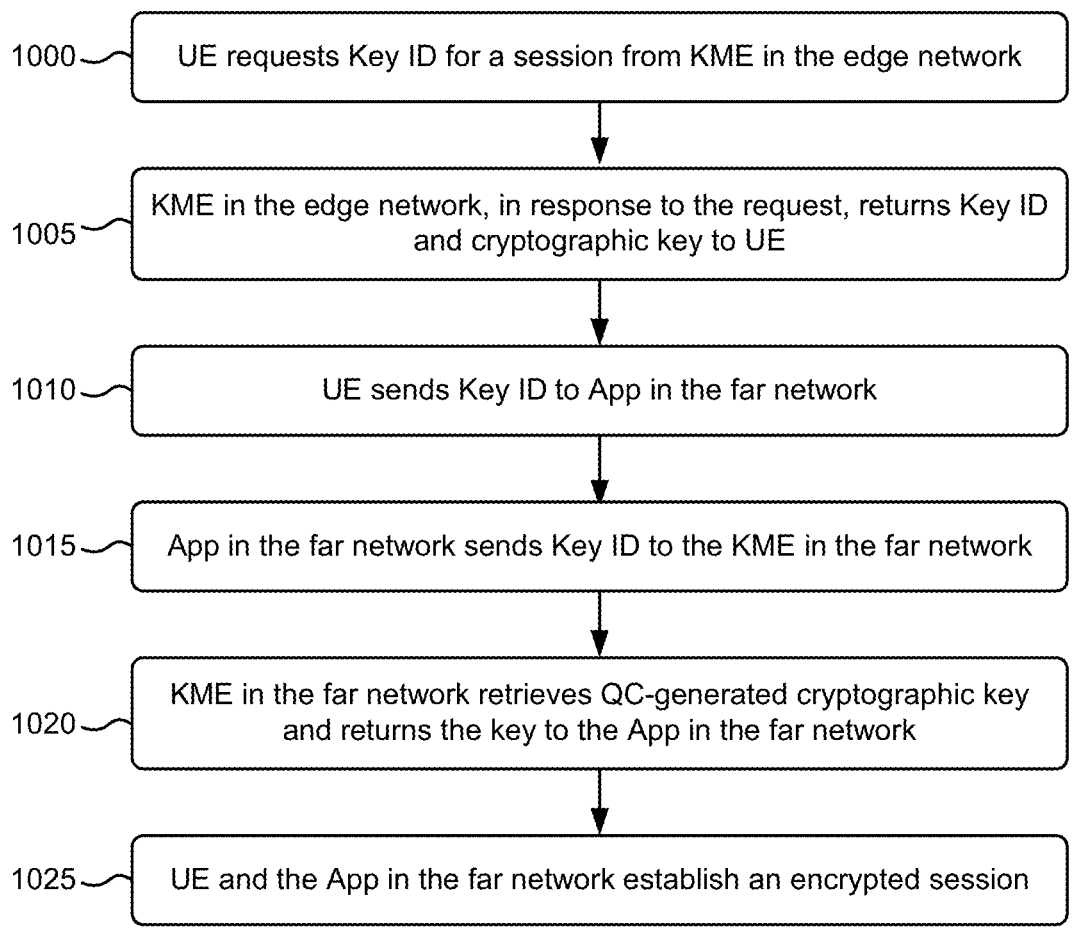
FIG. 10 is a flow diagram of an example process for establishing an encrypted session between a user equipment device and an application in a far network using a quantum cryptographic-generated cryptographic key.

FIG. 10 is a flow diagram of an example process for establishing an encrypted session between a UE 105 and an app 140-2 executing on a network device in far network 115 using a QC-generated cryptographic key from the process of FIG. 5. The example process of FIG. 10 may be implemented by a KME 135-2 in far network 115 in conjunction with a UE 105, and an app 140-2 in far network 115. The example process of FIG. 10 is described below with reference to FIG. 11. The example process of FIG. 10 may occur subsequent to two KMEs 135 (e.g., KME 135-1 in mobile edge network 110 and KME 135-2 in far network 115) engaging in QKD (identified with a "1" within a circle in FIG. 11) to distribute key material and to generate a symmetric encryption key, as described above with respect to FIGS. 5-7. The example process of FIG. 10 may, for example, be repeated for each encrypted session established between a UE 105 and an app 140-2 in far network 115.

Figure 11:
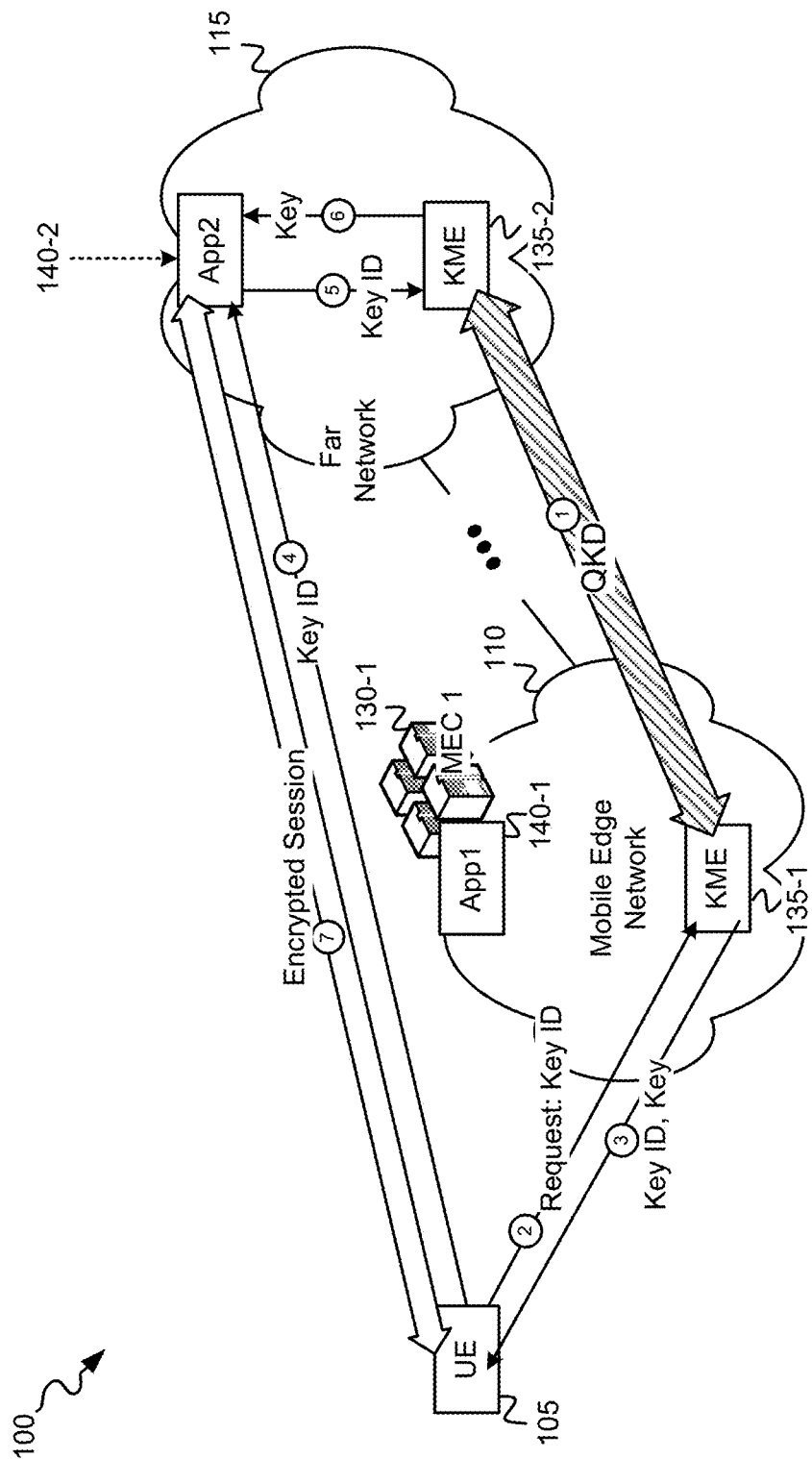
FIG. 11 depicts exemplary operations, messages, and/or data flows associated with an example process.

The example process may include a UE 105 requesting a key ID for a session from KME 135-2 in far network 115 (block 1000). KME 135-2 in far network 115, in response to the UE request, returns a key ID and a QC-generated cryptographic key to the requesting UE 105 (block 1005). FIG. 11 depicts UE 105 sending a Request (identified with a "2" within a circle) for a key ID, and KME 135-2 returning a message (identified with a "3" within a circle) that includes the requested key ID, and the symmetric encryption key that is associated with the key ID.

The UE 105 sends the received key ID to an app 140-2 in far network 115 with which it is requesting a session (block 1010), and the app 140-2 in far network 115 sends the received key ID to KME 135-2 in far network 115 (block 1015). FIG. 11 shows UE 105 sending a key ID (identified with a "4" within a circle) to app 140-2, and app 140-2 further sending the received key ID (identified with a "5" within a circle) to KME 135-2.

KME 135-2 in far network 115 retrieves a QC-generated cryptographic key, that corresponds to the received key ID, and returns the key to the app 140-2 in far network 110 (block 1020). KME 135-2 may perform a query to locate an entry 405 in data structure 400 having a key ID in field 410 that matches the received key ID. Upon locating the entry 405 with the matching key ID in field 410, KME 135-2 retrieves the cryptographic key stored in field 420 of the located entry 405. FIG. 11 depicts KME 135-2 sending the retrieved cryptographic (identified with a "6" within a circle) to app 140-2 executing in far network 115.

UE 105 and app 140-2 in far network 115 establish an encrypted session using the QC-generated cryptographic key (block 1025). UE 105 and app 140-2 may each use existing symmetric encryption/decryption techniques, and the cryptographic key, to encrypt and decrypt data sent between UE 105 and app 140-2. For example, UE 105 encrypts data, using the symmetric cryptographic key, and sends the encrypted data to app 140-2 as part of the encrypted session. App 140-2, upon receipt of the encrypted data, decrypts the data using the symmetric cryptographic key. Similarly, UE 105 may decrypt data, using the symmetric cryptographic key, sent from app 140-2 and encrypted by app 140-2 also using the symmetric cryptographic key. FIG. 11 shows UE 105 and app 140-2 engaging in an encrypted session (identified with a "7" within a circle) across mobile edge network 110, far network 115, and/or mobile core network 125 (not shown).

Figure 12:
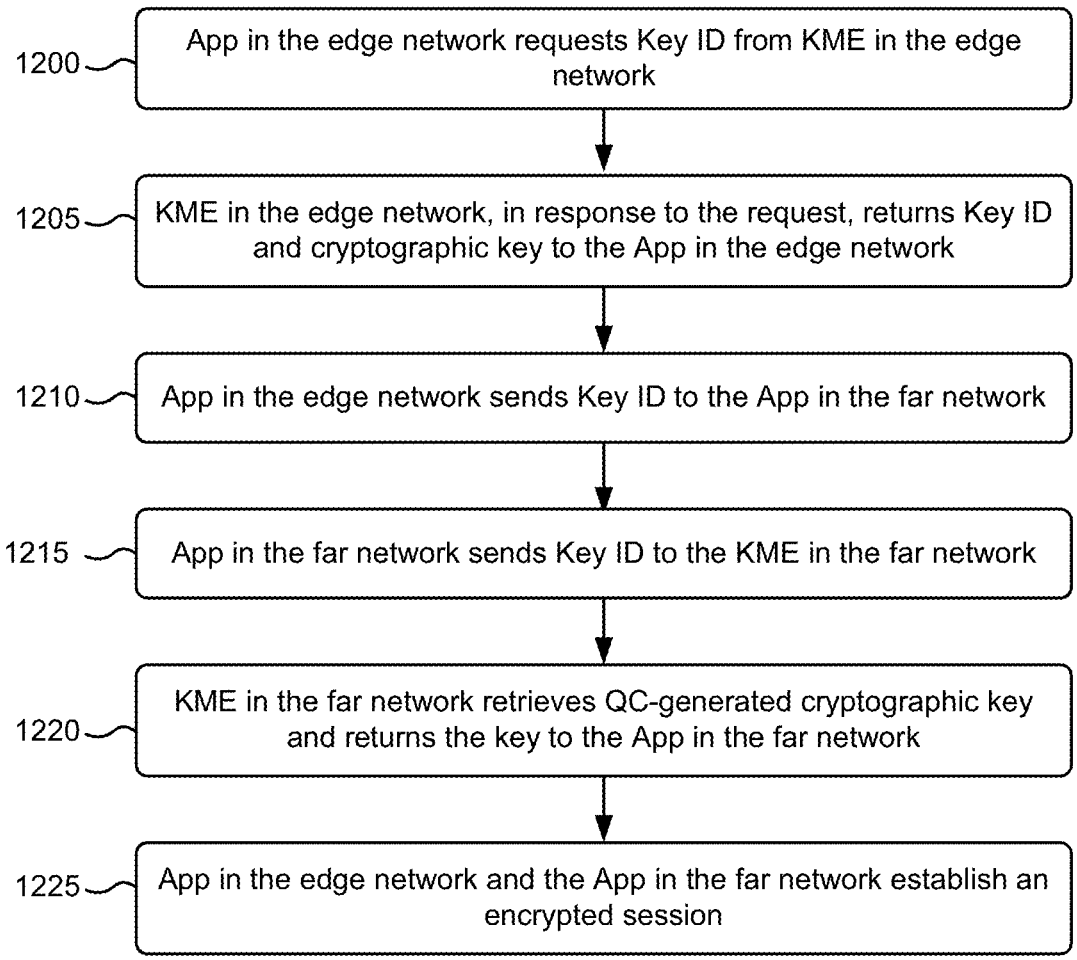
FIG. 12 is a flow diagram of an example process for establishing an encrypted session between a first application of a MEC in a mobile edge network and a second application in a far e network using a quantum cryptographic-generated cryptographic key.

FIG. 12 is a flow diagram of an example process for establishing an encrypted session between an app 140-1 of a MEC 130-1 in mobile edge network 110 and an app 140-2 executing in far network 115 using a QC-generated cryptographic key from the process of FIG. 5. The example process of FIG. 12 may be implemented by KME 135-1 in mobile edge network 110, KME 135-2 in far network 115, app 140-1 in mobile edge network 110, and app 140-2 in far network 115. The example process of FIG. 12 is described below with reference to FIG. 13. The example process of FIG. 12 may occur subsequent to two KMEs 135 (e.g., KME 135-1 in mobile edge network 110 and KME 135-2 in far network 115) engaging in QKD (identified with a "1" within a circle in FIG. 13) to distribute key material and to generate a symmetric encryption key, as described above with respect to FIGS. 5-7. The example process of FIG. 12 may, for example, be repeated for each encrypted session established between an app 140-1 of a MEC 130-1 in mobile edge network 110 and an app 140-2 in far network 115.

Figure 13:
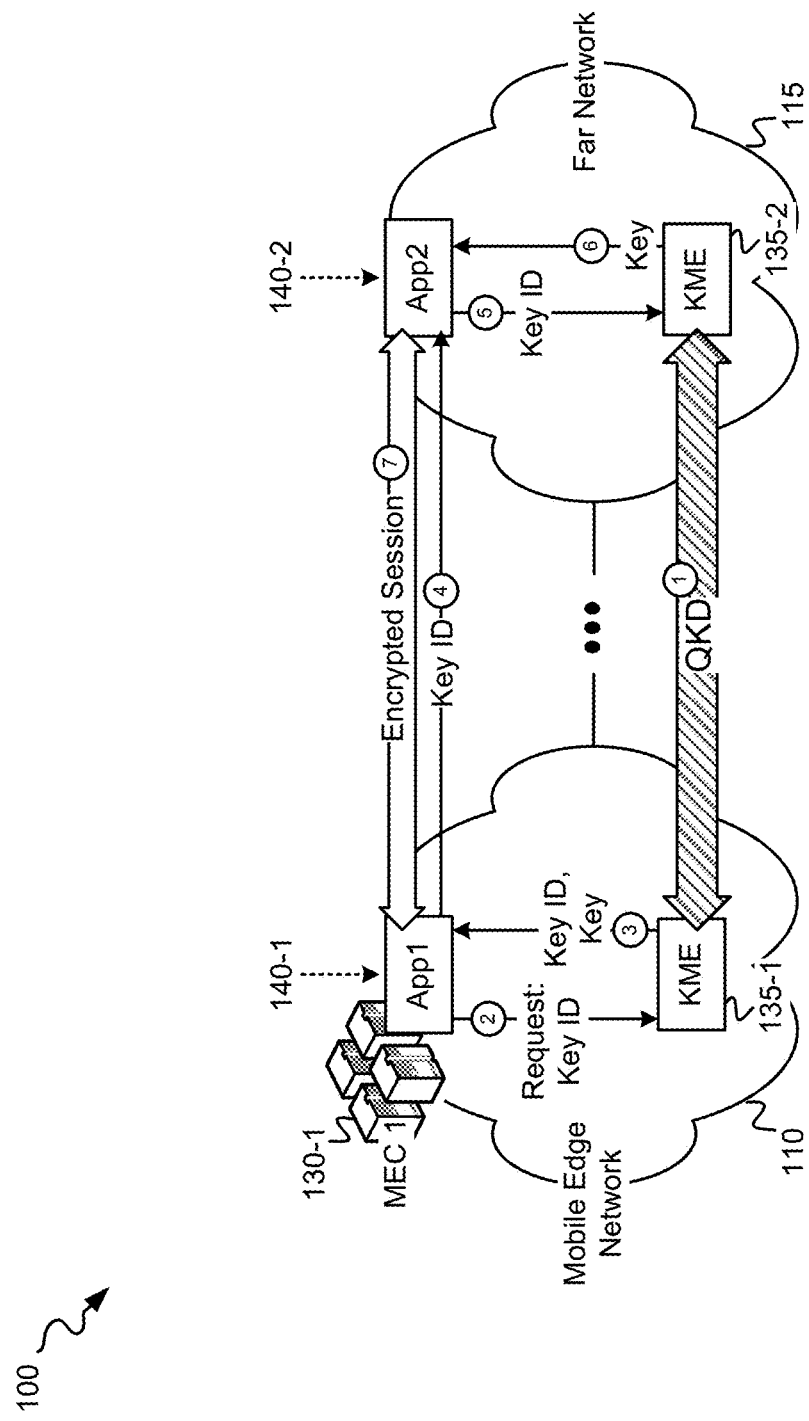
FIG. 13 depicts exemplary operations, messages, and/or data flows associated with an example process.

The example process may include app 140-1 of MEC 130-1 in mobile edge network 110 requesting a key ID for a session from KME 135-1 in mobile edge network 110 (block 1200). KME 135-1 in mobile edge network 110, in response to the UE request, returns a key ID and a QC-generated cryptographic key to the requesting app 140-1 (block 1205). FIG. 13 depicts app 140-1 sending a Request (identified with a "2" within a circle) for a key ID, and KME 135-1 returning a message (identified with a "3" within a circle) that includes the requested key ID, and the symmetric encryption key that is associated with the key ID.

The app 140-1 of MEC 130-1 in mobile edge network 110 sends the received key ID to an app 140-2 in far network 115 with which it is requesting a session (block 1210), and the app 140-2 in far network 115 sends the received key ID to KME 135-2 in far network 115 (block 1215). FIG. 13 shows app 140-1 sending a key ID (identified with a "4" within a circle) to app 140-2, and app 140-2 further sending the received key ID (identified with a "5" within a circle) to KME 135-2.

KME 135-2 in far network 115 retrieves a QC-generated cryptographic key, that corresponds to the received key ID, and returns the key to the app 140-2 (block 1220). KME 135-2 may perform a query to locate an entry 405 in data structure 400 having a key ID in field 410 that matches the received key ID. Upon locating the entry 405 with the matching key ID in field 410, KME 135-2 retrieves the cryptographic key stored in field 420 of the located entry 405. FIG. 13 depicts KME 135-1 sending the retrieved cryptographic (identified with a "6" within a circle) to app 140-2 executing in far network 115.

App 140-1 in mobile edge network 110 and app 140-2 in far network 115 establish an encrypted session using the QC-generated cryptographic key (block 1225). App 140-1 and app 140-2 may each use existing symmetric encryption/decryption techniques, and the cryptographic key, to encrypt and decrypt data sent between app 140-1 and app 140-2. For example, app 140-1 encrypts data, using the symmetric cryptographic key, and sends the encrypted data to app 140-2 as part of the encrypted session. App 140-2, upon receipt of the encrypted data, decrypts the data using the symmetric cryptographic key. Similarly, app 140-1 may decrypt data, using the symmetric cryptographic key, sent from app 140-2 and encrypted by app 140-2 also using the symmetric cryptographic key. FIG. 13 shows app 140-1 and app 140-2 engaging in an encrypted session (identified with a "7" within a circle) across mobile edge network 110, far network 115, and/or mobile core network 125 (not shown).

Many applications executing on mobile wireless devices require randomness. For example, gaming, gambling, and cryptographic applications require randomized data as an input. The quality of the randomness required for these applications, however, varies. For example, while a gaming application may not always require a high level of randomness/entropy, a gambling or cryptographic application likely requires a high level of randomness/entropy. Most kinds of pseudorandom number generators used by applications generate numbers that are insufficiently random, or have a sufficient level of entropy, for many use cases. The random function on mobile wireless devices suffers from a condition called modulo bias in which some numbers appears more often than others. The random function also depends on a seed value to generate the sequence of random numbers. Although device manufacturers have devised innovative methods to generate a unique seed for the random function, the generated numbers are still considered to be pseudorandom and not cryptographically robust.

Figure 14:
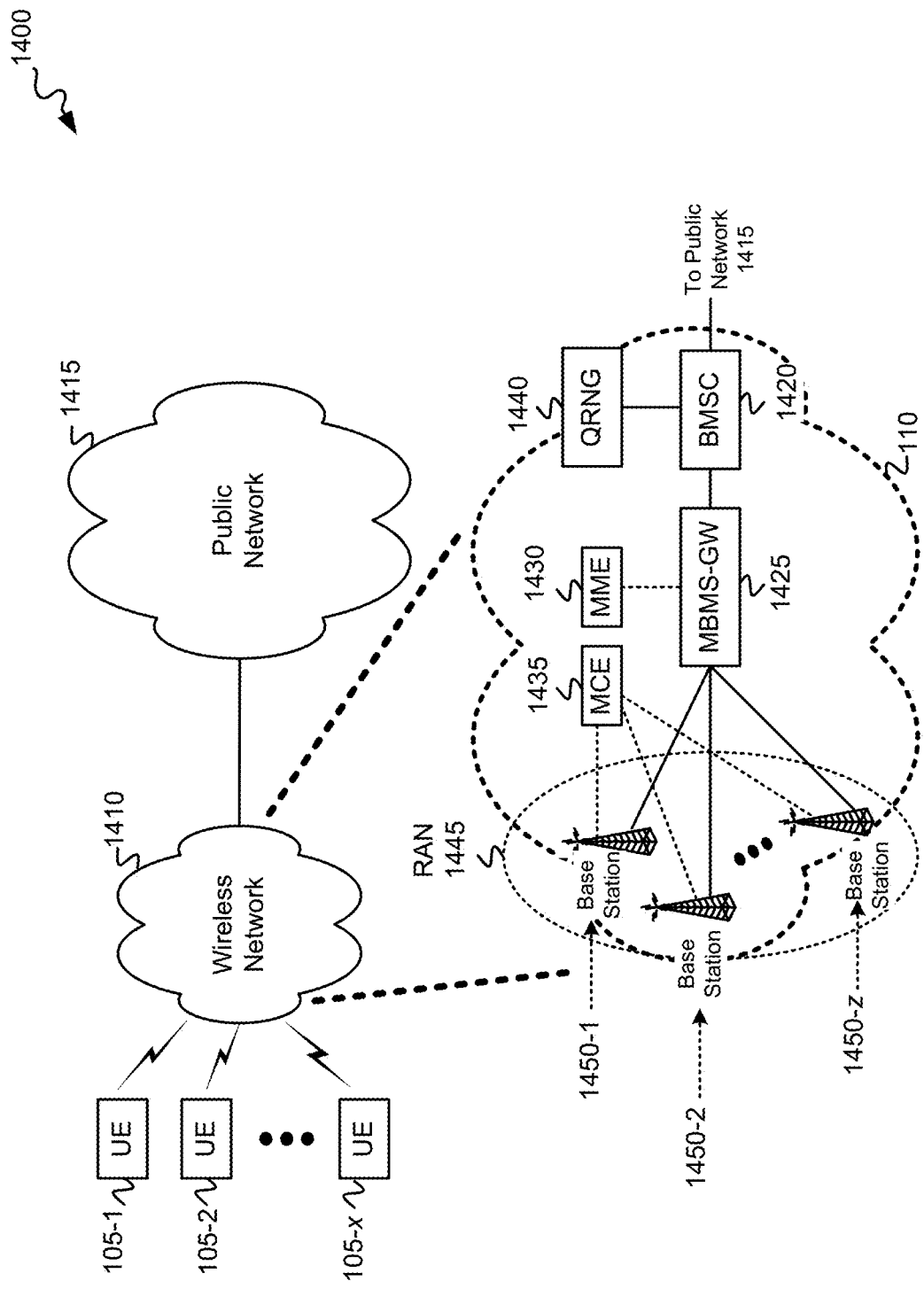
FIG. 14 illustrates an exemplary network environment in which a quantum random number generator is deployed within a wireless network.

FIG. 14 illustrates an exemplary network environment 1400 in which a quantum random number generator is deployed within a wireless network to generate true random sequences of data. As shown, network environment 100 may include multiple UEs 105-1 through 105-x, a wireless network 1410, and a public network 1415.

As previously described, UEs 105-1 through 105-x may each include an electronic device that further includes at least one communication interface for communicating via a wireless network(s), such as wireless network 1410. Wireless network 1410 may include one or more wireless networks including, for example, one or more PLMNs and/or one or more satellite mobile networks. The PLMN(s) may include any type of PLMN. In some implementations, the PLMN(s) may include a 4G, a 5G, and/or a hybrid 4G/5G PLMN(s). An example of components of wireless network 1410 is described further below.

Public network 1415 may include one or more networks of various types including, for example, a telecommunications network (e.g., Public Switched Telephone Networks (PSTNs)), the Internet, a wired and/or wireless local area network (LAN), a wired and/or wireless wide area network (WAN), a metropolitan area network (MAN), an intranet, and/or a cable network (e.g., an optical cable network).

In one example implementation, as shown in FIG. 14, wireless network 1410 may include, among other components, a broadcast multicast service center (BMSC) 1420, a Multimedia Broadcast Multicast Services (MBMS) gateway (MBMS-GW) 1425, a mobility management entity (MME) 1430, a MBMS coordination entity (MCE) 1435, a Quantum Random Number Generator (QRNG) 1440, and a Radio Access Network (RAN) 1445 that includes multiple base stations 1450-1 through 1450-z (hereinafter "base station 1450" or "base stations 1450"). Each base station 1450 may include, for example, an Evolved Node B (eNodeB) or a Next Generation Node B (gNodeB).

As shown in FIG. 14, UEs 105-1 through 105-x may wirelessly connect to various different base stations 1450 of RAN 1445. The base stations 1450 shown in FIG. 14 may, for example, be members of an evolved MBMS (eMBMS) synchronization area that includes a group of multiple base stations 1450 that are synchronized to transmit multicast data in a same multicast channel (MCH). The base stations 1450 in the synchronization area transmit the same broadcast signals in a synchronized manner for better signal reception at UEs 105. Base stations 1450 each include hardware that communicates with wireless devices (e.g., UEs 105) to enable network service with wireless network 1410 (e.g., a PLMN). Each of base stations 1450 includes a wireless transceiver for communicating with the wireless devices (e.g. UEs 105), and a wired or wireless connection to other nodes of wireless network 1410, such as a wired or wireless connection to MBMS-GW 1425 and/or MCE 1435.

BMSC 1420 includes one or more network devices that engage in authentication, content authorization, and billing; act as a proxy content server; and configure data flow through wireless network 1410. MBMS-GW 1425 includes one or more network devices that deliver MBMS packets to each base station 1450 transmitting the MBMS service. MBMS-GW 1425 may, for example, use Internet Protocol (IP) multicast to deliver the downlink packets to base stations 1450.

MME 1430 includes one or more network devices that perform, within wireless network 1410, mobility management functions, call control management functions, session management functions, and/or identity management functions associated with providing network service to UEs 105.

MCE 1435 includes one or more network devices that are responsible for allocating time and frequency resources within wireless network 1410. MCE 1435 acts as an MBMS scheduler that allocates radio resources, performs session admission control, and manages MBMS services.

QRNG 1440 includes one or more devices that implement a quantum random number generator which generates, using principles of quantum physics, an entropy stream that includes a true random sequence of bits. QRNG 1440 may exploit the inherent randomness in quantum processes to generate true random numbers (or a true random sequences of bits). An "entropy stream," as used herein, refers to a stream of a random sequence of bits. In different implementations, QRNG 1440 may measure various different quantum processes, such as quantum phase fluctuations, spontaneous emission noise, photon arrival times, stimulated Raman scattering, photon polarization state, or vacuum fluctuations. For example, in one example implementation, QRNG 1440 may include a single photon detection system for generating random sequences of bits. In another example, QRNG 1440 may include a system that uses the vacuum fluctuations of an electromagnetic field for random number generation. Subsequent to generation of the random number or entropy stream, QRNG 1440 supplies the random number/entropy stream to BMSC 1420 which, in turn, forwards the entropy stream, via MBMS-GW 1425, to base stations 1445 for delivery to UEs 105.

The configuration of the components of network environment 1400 depicted in FIG. 14 is for illustrative purposes, and other configurations may be implemented. Therefore, network environment 1400 may include additional, fewer and/or different components, that may be configured differently than depicted in FIG. 14.

Figure 15:
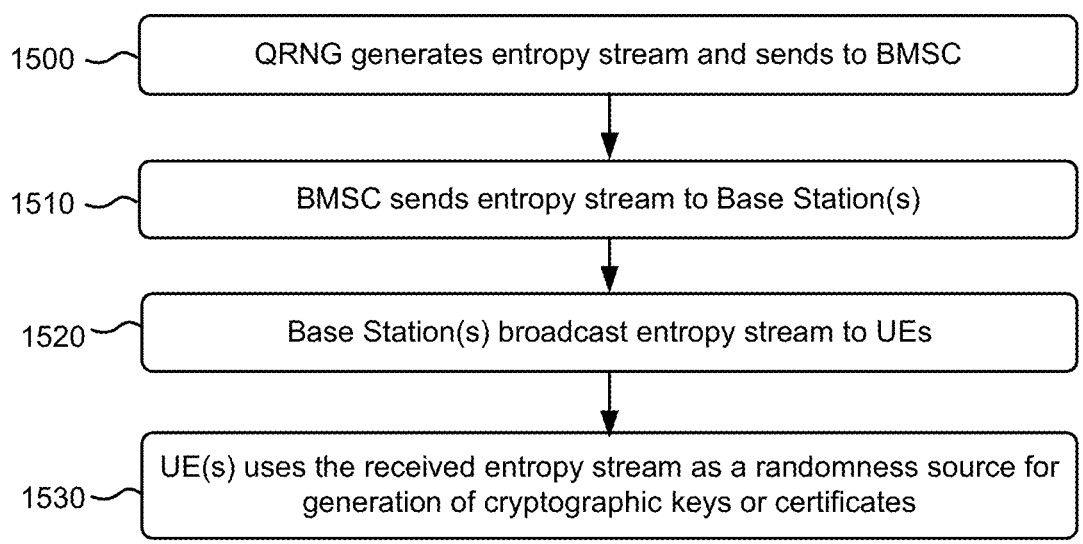
FIG. 15 is a flow diagram of an example process for the generation of quantum random numbers for use by user equipment devices in a wireless network.

FIG. 15 is a flow diagram of an example process for the generation of quantum random numbers for use by UEs 105 in a wireless network 1410. The example process of FIG. 15 may be implemented by QRNG 1440, in conjunction with BMSC 1420, MBMS-GW 1425, and one or more base stations 1450. The example process of FIG. 15 is described below with reference to diagram 16. The example process of FIG. 15 may be repeated, for example, for each stream of q random bits generated by QRNG 1440, wherein the value of q may vary from stream to stream. The example process of FIG. 15 may, thus, be continuously repeated to generate r streams of random bits for broadcast to UEs 105. Alternatively, the process of FIG. 15 may be repeated periodically, or upon demand, to generate r streams of random bits.

Figure 16:
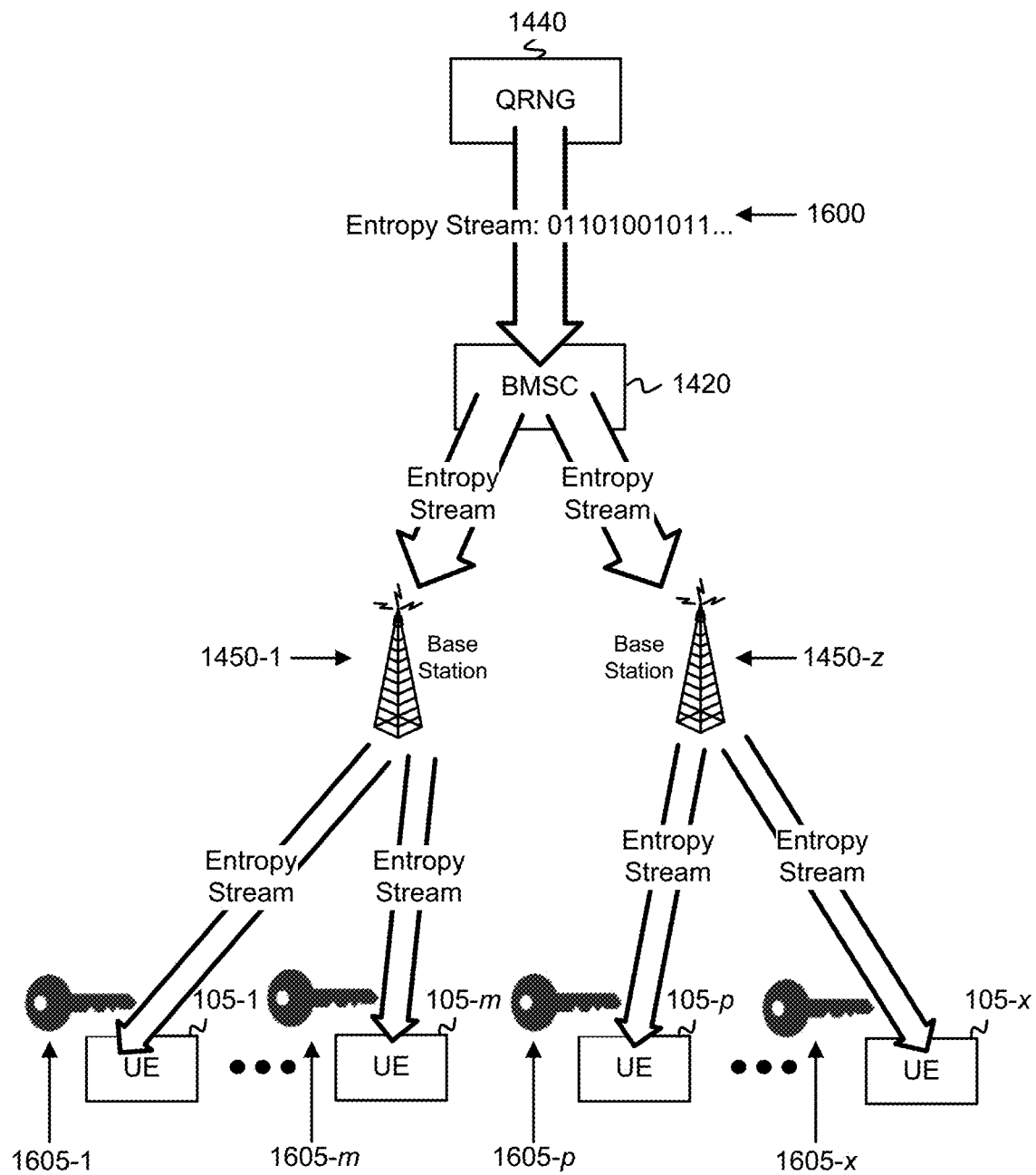
FIG. 16 depicts exemplary operations, messages, and/or data flows associated with an example process.

The example process of FIG. 15 includes QRNG 1440 generating an entropy stream and sending the stream to BMSC 1420. BMSC 1420, in turns, sends the entropy stream to one or more base stations 1450 via MBMS-GW 1425 (block 1510). As described above, QRNG 1440 may use various quantum process measurements, including quantum phase fluctuations, spontaneous emission noise, photon arrival times, stimulated Raman scattering, photon polarization state, or vacuum fluctuations, to generate the random sequence of bits of the entropy stream. FIG. 16 depicts QRNG 1440 generating an entropy stream 1600 and sending the entropy stream to BMSC 1420. BMSC 1420, as further shown in FIG. 16, sends the entropy stream on to one or more base stations 1450.

Upon receipt of an entropy stream, a base station 1450 broadcasts the entropy stream to one or more UEs 105 (block 1520), and each UE 105, upon receipt of the entropy stream, uses the bits of the entropy stream as a randomness source for generating cryptographic keys or certificates (block 1530). Each UE 105 may execute a particular application (e.g., gaming, gambling, cryptographic) that inputs the random bits of the entropy stream and uses those bits as a randomness source for executing functions of the application. For example, a cryptographic application may input the random bits of the entropy stream into a function that generates a cryptographic key (e.g., a symmetric encryption key) using the bits of the entropy stream. The application at UE 105 may use the bits of the entropy stream by themselves as an input to a function to generate a cryptographic key or certificate, or may combine the bits of the entropy stream with bits from another source (e.g., a pseudo-random source of bits generated by the UE 105 or an application executing at the UE 105). FIG. 16 illustrates base station 1450-1 broadcasting the entropy stream to UEs 105-1 through 105-m, and base station 1450-z broadcasting the entropy stream to UEs 105-p through 105-x. As further shown in the example of FIG. 16, UE 105-1 uses the received entropy stream to generate a cryptographic key 1605-1, UE 105-m uses the received entropy stream to generate a cryptographic key 1605-m, UE 105-p uses the received entropy stream to generate a cryptographic key 1605-p, and UE 105-x uses the received entropy stream to generate a cryptographic key 1605-x.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 8, 10, 12, and 15, and sequences of operations, messages, and/or data flows with respect to FIGS. 6, 9, 11, 13, and 16, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 220) of a device. A non-transitory storage medium includes one or more of the storage mediums described in relation to memory 230. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
engaging, by a first key management entity (KME) in a mobile edge network, in quantum key distribution (QKD) with a second KME in a far network to generate a secret cryptographic key that is shared between the first KME and the second KME,
determining, by the first KME, a key identifier (ID) for associating with the cryptographic key;
sending, by the first KME, the key ID to the second KME for association with the secret cryptographic key at the second KME;
receiving, by the first KME, a session request from a first session endpoint for a session across at least one of the mobile edge network or the far network, wherein the mobile edge network and the far network connect to a mobile core network and wherein the far network is farther away, from a latency standpoint, from the first session endpoint relative to the mobile edge network; and
sending, by the first KME, the key ID and the cryptographic key to the first session endpoint for establishing an encrypted session across the at least one of the mobile edge network or the far network between the first session endpoint and a second session endpoint.

2. The method of claim 1, wherein the first session endpoint comprises a User Equipment device (UE) and the second session endpoint comprises a first application executing at a first Multi-Access Edge Computing (MEC) platform in the mobile edge network.

3. The method of claim 2, wherein the encrypted session is established across the mobile edge network between the UE and the first application.

4. The method of claim 1, wherein the first session endpoint comprises a User Equipment device (UE) and the second session endpoint comprises a second application executing at a network device in the far network.

5. The method of claim 4, wherein the encrypted session is established across the mobile edge network and the far network between the UE and the second application.

6. The method of claim 1, wherein the first session endpoint comprises a first application executing at a first Multi-Access Edge Computing (MEC) platform in the mobile edge network and the second session endpoint comprises a second application executing at a network device in the far network.

7. The method of claim 6, wherein the encrypted session is established across the mobile edge network and the far network between the first application and the second application.

8. The method of claim 1, wherein engaging in QKD comprises using a quantum channel between the first KME and the second KME for sending key material associated with the cryptographic key.

9. A first key management entity (KME) in a mobile edge network, comprising:
a quantum cryptographic transceiver configured to engage in quantum key distribution (QKD) with a second KME in a far network to generate a secret cryptographic key that is shared between the first KME and the second KME;
at least one communication interface; and
at least one processing unit configured to:
determine a key identifier (ID) for associating with the cryptographic key,
send, via the at least one communication interface, the key ID to the second KME for association with the secret cryptographic key at the second KME,
receive, via the at least one communication interface, a session request from a first session endpoint for a session across at least one of the mobile edge network or the far network, wherein the mobile edge network and the far network connect to a mobile core network and wherein the far network is farther away, from a latency standpoint, from the first session endpoint relative to the mobile edge network, and
send, via the at least one communication interface, the key ID and the cryptographic key to the first session endpoint for establishing an encrypted session across the at least one of the mobile edge network or the far network between the first session endpoint and a second session endpoint.

10. The network device of claim 9, wherein the first session endpoint comprises a User Equipment device (UE) and the second session endpoint comprises a first application executing at a first Multi-Access Edge Computing (MEC) platform in the mobile edge network.

11. The network device of claim 10, wherein the encrypted session is established across the mobile edge network between the UE and the first application.

12. The network device of claim 9, wherein the first session endpoint comprises a User Equipment device (UE) and the second session endpoint comprises a second application executing at a network device in the far network.

13. The network device of claim 12, wherein the encrypted session is established across the mobile edge network and the far network between the UE and the second application.

14. The network device of claim 9, wherein the first session endpoint comprises a first application executing at a first Multi-Access Edge Computing (MEC) platform in the mobile edge network and the second session endpoint comprises a second application executing at a network device in the farnetwork.

15. The network device of claim 14, wherein the encrypted session is established across the mobile edge network and the far network between the first application and the second application.

16. The network device of claim 9, wherein engaging in QKD comprises using a quantum channel between the first KME and the second KME for sending key material associated with the cryptographic key.

17. A non-transitory storage medium storing instructions executable by a first key management entity (KME) in a mobile edge network, wherein the instructions comprise instructions to cause the first KME to:
engage in quantum key distribution (QKD) with a second KME in a far network to generate a secret cryptographic key that is shared between the first KME and the second KME;
determine a key identifier (ID) for associating with the cryptographic key;
send the key ID to the second KME for association with the secret cryptographic key at the second KME;
receive a session request from a first session endpoint for a session across at least one of the mobile edge network or the far network, wherein the mobile edge network and the far network connect to a mobile core network and wherein the far network is farther away, from a latency standpoint, from the first session endpoint relative to the mobile edge network; and send the key ID and the cryptographic key to the first session endpoint for establishing an encrypted session across the at least one of the mobile edge network or the far network between the first session endpoint and a second session endpoint.

18. The non-transitory storage medium of claim 17, wherein the first session endpoint comprises a User Equipment device (UE) and the second session endpoint comprises a first application executing at a first Multi-Access Edge Computing (MEC) platform in the mobile edge network, and wherein the encrypted session is established across the mobile edge network between the UE and the first application.

19. The non-transitory storage medium of claim 17, wherein the first session endpoint comprises a User Equipment device (UE) and the second session endpoint comprises a second application executing at a network device in the far network, and wherein the encrypted session is established across the mobile edge network and the far network between the UE and the second application.

20. The non-transitory storage medium of claim 17, wherein the first session endpoint comprises a first application executing at a first Multi-Access Edge Computing (MEC) platform in the mobile edge network and the second session endpoint comprises a second application executing at a network device in the far network, and wherein the encrypted session is established across the mobile edge network and the far network between the first application and the second application.

* * * * *